US008290040B2

(12) United States Patent
Li et al.

(10) Patent No.: US 8,290,040 B2
(45) Date of Patent: *Oct. 16, 2012

(54) METHOD AND SYSTEM FOR ESTIMATING GLOBAL MOTION IN VIDEO SEQUENCES

(75) Inventors: Yongmin Li, Ipswich (GB); Li-Qun Xu, Kesgrave (GB); David G Morrison, Felixstowe (GB); Charles Nightingale, Felixstowe (GB); Jason Morphett, Halesworth (GB)

(73) Assignee: British Telecommunications public limited company, London (GB)

( * ) Notice: Subject to any disclaimer, the term of this patent is extended or adjusted under 35 U.S.C. 154(b) by 1433 days.

This patent is subject to a terminal disclaimer.

(21) Appl. No.: 10/535,420

(22) PCT Filed: Nov. 18, 2003

(86) PCT No.: PCT/GB03/05007
§ 371 (c)(1),
(2), (4) Date: May 19, 2005

(87) PCT Pub. No.: WO2004/049260
PCT Pub. Date: Jun. 10, 2004

(65) Prior Publication Data
US 2006/0023786 A1    Feb. 2, 2006

(30) Foreign Application Priority Data
Nov. 26, 2002 (GB) .................................. 0227566.7

(51) Int. Cl.
*H04N 7/12* (2006.01)
(52) U.S. Cl. ............ 375/240.12; 375/240.16; 345/419; 345/629

(58) Field of Classification Search ............. 375/240.12, 375/240.16; 345/419, 629
See application file for complete search history.

(56) References Cited

U.S. PATENT DOCUMENTS

| 5,650,822 | A | 7/1997 | Heisler et al. |
| 5,717,470 | A | 2/1998 | Jung |
| 6,275,527 | B1 | 8/2001 | Bist et al. |
| 6,348,918 | B1 * | 2/2002 | Szeliski et al. ............... 345/419 |
| 6,442,204 | B1 | 8/2002 | Snook et al. |

(Continued)

FOREIGN PATENT DOCUMENTS
EP    0 652 678    5/1995
(Continued)

OTHER PUBLICATIONS

Hampel et al, ?The Approach Based on Influence Functions, Robust Statistics, John Wiley & Sons Inc., 1986.

(Continued)

*Primary Examiner* — Sath V Perungavoor
*Assistant Examiner* — James Pontius
(74) *Attorney, Agent, or Firm* — Nixon & Vanderhye PC

(57) ABSTRACT

The invention relates to estimating the global motion between frames of a motion-compensated inter-frame encoded video sequence, directly from the motion vectors encoded within the frames. For any particular frame, a motion estimation is determined from motion vectors direct from the frame's anchor frame to the frame in question. This motion estimation is then checked against pre-determined criteria, and where the criteria are not met, re-estimation along a different route is performed, using the bi-directional motion vectors contained within B-frames. A panoramic image generating method and system which makes uses of the global motion estimations thus obtained is also described.

23 Claims, 13 Drawing Sheets

U.S. PATENT DOCUMENTS

| | | | |
|---|---|---|---|
| 6,977,664 | B1* | 12/2005 | Jinzenji et al. ............... 345/629 |
| 2002/0131502 | A1 | 9/2002 | Monro et al. |
| 2003/0103568 | A1* | 6/2003 | Lee et al. ............... 375/240.16 |
| 2004/0028134 | A1* | 2/2004 | Subramaniyan et al. 375/240.16 |
| 2006/0062296 | A1 | 3/2006 | Li et al. |
| 2006/0072663 | A1 | 4/2006 | Li et al. |

FOREIGN PATENT DOCUMENTS

| | | |
|---|---|---|
| EP | 0 689 359 | 12/1995 |
| EP | 0825778 A2 | 8/1997 |
| EP | 0907144 A2 | 4/1999 |
| GB | 2349027 A | 10/2000 |
| WO | 00/70879 | 11/2000 |
| WO | WO 01/95632 A2 | 12/2001 |

OTHER PUBLICATIONS

Huber, Robust Statistics, John Wiley & Sons, 1981.

Meer et al., Robust Regression Methods for Computer Vision: A Review, International Journal of Computer Vision, 6(1):59-70, 1991.

Meer et al., Robust Computer Vision: an Interdisciplinary Challenge, Computer Vision and Image Understanding, 78:1-7, 2000.

Meng et al, "CVEPS: A Compressed Video Editing and Parsing System", In ACM Multimedia, 1996.

GB Search Report.

International Search Report.

Ad-Hoc Group on Core Experiments on Error Resilience Aspects, "Description of Error Resilient Core Experiments", ISO-IEC JTC1-SC29-WG11 N1808, Jul. 25, 1997, pp. 1-32.

Costa, Alessandra et al., "A VLSI Architecture for Hierarchical Motion Estimation", IEEE Transactions on Consumer Electronics, vol. 41, No. 2, May 1, 1995, pp. 248-257.

Irani, Michal et al., "Video Indexing Based on Mosaic Representations", Proceedings of the IEEE, vol. 86, No. 5, May 1998, pp. 905-921.

Pilu, Maurizio, "On Using Raw MPEG Motion Vectors to Determine Global Camera Motion", Proceedings of the SPIE, vol. 3309, 1997, pp. 448-459.

Vemuri, B.C. et al., "Reliable and Efficient Image Registration", Technical Report UF-CISETR97-019, Online! 1997, URL:citeseer.ist.psu.edu/vemuri97reliable, pp. 1-6.

International Search Report dated Sep. 6, 2004.

Irani et al., "Efficient Representations of Video Sequences and Their Applications", Signal Processing. Image Communication, Elsevier Science Publishers, Amsterdam, NL, vol. 8, No. 4, May 1, 1996, pp. 327-351, XP000586005.

Smolic et al., "Long-Term Global Motion Estimation and its Application for Sprite Coding, Content Description, and Segmentation", IEEE Transactions on Circuits and Systems, for Video Technology, IEEE Inc., New York, US, vol. 9, No. 8, Dec. 1999, pp. 1227-1242, XP0009333894.

Jones et al., "Building Mosaics from Video Using MPEG Motion Vectors", ACM Multimedia, Proceedings of the International Conference, New York, US, Oct. 1999, pp. 29-32, XP002272152.

Sawhney et al., "Model-Based 2D&3D Dominant Motion Estimation for Mosaicing and Video Representation", Computer Vision, Fifth International Conference on Cambridge, MA, USA, IEEE Comput. Soc. Jun. 20, 1995, pp. 583-590, XP010147046.

UK Search Report of May 7, 2003.

International Search•Report—Mar. 2, 2004.

Rousseeuw, "Least Median of Squares Regression", Journal of the American Statistical Association, American Statistical Association, New York, US, vol. 79, No. 388, Dec. 1984, pp. 871-880, XP008024952, ISSN: 0162-1459.

Smolic et al., "Low-Complexity Global Motion Estimation from P-frame Motion Vectors for MPEG-7 Applications", Proceedings 2000 International Conference on Image Processing (Cat. No. 00CH37101), Proceedings of $7^{th}$ IEEE International Conference on Image Processing, Vancouver, BC, Canada Sep. 10-13, 2000, pp. 271-274, vol. 2, XP002272151.

Odone et al., "Layered Representation of A Video Shot with Mosaicing", Pattern Analysis and Applications, 2002, Springer-Verlag, UK, vol. 5, No. 3, Aug. 20002, pp. 296-305, XP002272153, ISSN: 1433-7541.

Wiegand et al., "Multiple Reference Picture Video Coding Using Polynomial Motion Models", Visual Communications and Image Processing '98, San Jose, CA, Jan. 28-30, 1998, vol. 3309, pp. 134-145, XP002272154, Proceedings of the SPIE—The International Society for Optical Engineering, 1997, SPIE-Int. Soc. Opt. Eng. USA, ISSN: 0277-786X.

Ben-Ezra et al., "Real-Time Motion Analysis with Linear Programming", Computer Vision and Image Understanding, Academic Press, San Diego, CA. US, vol. 78, No. 1, Apr. 2000, pp. 32-52, XP004439285, ISSN: 1077-3142.

Peleg et al., "Panoramic Mosaics by Manifold Projection", Computer Vision and Pattern Recognition, 1997, Proceedings, 1997 IEEE Computer Society Conference on San Juan, Puerto Rico, Jun. 17-19, 1997, Los Alamitos, CA, USA, IEEE Comput. Soc., US, Jun. 17, 1997, pp. 338-343, XP010237545.

International Search Report—Sep. 3, 2004.

Applicant Response filed Nov. 16, 2009 in U.S. Appl. No. 10/535,621.

Office Action dated Jul. 14, 2009 in U.S. Appl. No. 10/535,621.

Office Action dated Jun. 25, 2009 in U.S. Appl. No. 10/535,634.

Tan et al., "Rapid Estimation of Camera Motion from Compressed Video With Application to Video Annotation", IEEE Transactions on Circuits and Systems for Video Technology, IEEE Inc. New York, US, vol. 10, No. 1, Feb. 2000, pp. 133-146, ISSN: 1051-8215.

U.S. Appl. No. 10/535,621, Li et al., filed May 20, 2005.

U.S. Appl. No. 10/535,634, Li et al., filed May 20, 2005.

Applicant Response filed Jul. 6, 2010 in U.S. Appl. No. 10/535,621 (pp. 1-31).

USPTO Office Action mailed Feb. 3, 2010 in U.S. Appl. No. 10/535,621 (pp. 1-32).

* cited by examiner

METHOD AND SYSTEM FOR ESTIMATING GLOBAL MOTION IN VIDEO SEQUENCES

This application is the US national phase of international application PCT/GB2003/005007 filed 18 Nov. 2003 which designated the U.S. and claims benefit of GB 0227566.7, dated 26 Nov. 2002, the entire content of which is hereby incorporated by reference.

TECHNICAL FIELD

The example embodiments of the present invention relate to a method and system for estimating the global motion between frames in a video sequence, and also to a method and system for generating panoramic images from video sequences using the global motion estimations. In particular global motion estimations and panoramic images are produced from video sequences comprising motion-compensated and inter-frame encoded image frames.

BACKGROUND

Amongst all the different types of multimedia data, video contains the richest source of information while it demands the largest storage and network bandwidth due to spatial and temporal redundancy. The most successful and widely-adopted video compression techniques, MPEG1, MPEG2 and MPEG4 for example, try to exploit the redundancy by using motion-compensated coding scheme. However, the conventional scheme to store and encode video data is based on a sequence of 2D image frames. Obviously, this kind of representation intrinsically separates the spatio-temporal connection of the content. Moreover, as information has to be represented redundantly in many frames, it also brings a heavy burden to computation, storage and transmission.

Panoramic scene reconstruction has been an interesting research topic for several decades. By warping a sequence of images onto a single reference mosaic image, we not only obtain an overview of the content across the whole sequence but also reduce the spatio-temporal redundancy in the original sequence of images. An example of how frames can be built up to provide a panoramic image is shown in FIG. 1, whereas an example panoramic image generated using a prior art technique is shown in FIG. 2.

Considering FIG. 1 first, here we show a series of consecutive image frames from a video sequence, and which have been consecutively numbered from 2 to 8. Frame 2 is the initial frame in the sequence, followed by frame 3, frame 4, and so on in order until frame 8. The different positions of the frames as represented on the page represent the movement of the camera used to take the frames. That is, in the example, the camera is panning from right to left, as shown. In addition, however, the increasingly smaller size of frames 3 to 8 with respect to each other and to frame 2 indicates that the camera was also progressively zooming in, such that the image obtained in any of frames 3 to 8 with respect to the first image of frame 2 is smaller. Furthermore, the increasing angle of frames 6 to 8 shows that for these frames the camera was also tilting in addition to zooming and panning.

In order to generate a panoramic image from these frames, it is necessary first to register the correspondence between each frame, that is, to decide for each frame how the image depicted therein relates to the images in the other frames. This problem is analogous to that familiar to jigsaw puzzle users and mosaic layers around the world, in that given a part of an image the correspondence of that part to the whole must be established. The situation with panoramic scene construction is further complicated in that the images significantly overlap, and may also be repeated (i.e. in the case where there is no camera movement or motion in the scene, then multiple identical frames are produced). It is essentially this problem of image registration between frames which one aspect of example embodiments of the present invention addresses.

Within FIG. 1 the image registration has already been established, and the overlapping images provide an envelope for the panoramic image. There next follows the problem of choosing which pixel value must be used for the panorama, in that for each pixel within the panorama, there will be one or more corresponding pixel values. More particularly, in an area of the panorama where no frames overlap, there will be but a single available pixel value. However, where frames overlap there will be as many available pixel values as there are overlapping frames. A further problem is therefore that of choosing which pixel value to use for each pixel of the panoramic image.

FIG. 2 illustrates an example panoramic image generated using a prior art "least mean squares" approach, which will be described later. The image is a background panorama of a football match, and specifically, that of the Brazil v. Morocco match of the FIFA 1998 World Cup Finals, held in France. Within the present specification, all Figures illustrating a video frame are taken from source MPEG video of this match. Within FIG. 2 it will be seen that a panorama of one half of a football pitch is shown. Many errors occur in the image, however, and in particular in respect of the lines which should be present on the pitch, in respect of the depiction of the goal, and in the depiction of the far side of the pitch. As will become apparent later, example embodiments of the present invention overcome many of these errors.

PRIOR ART

In specific previous studies relating to panoramic imaging and motion estimation, Sawhney et al. (in H. Sawhney, S. Ayer, and M. Gorkani. *Model-based 2D&3D dominant motion estimation for mosaicing and video representation IEEE International Conference* on Computer Vision, Cambridge, Mass., USA, 1995) reported a model-based robust estimation method using M-estimators. 2D affine, plane projective and 3D motion models have been studied. An automatic method of computing a scale parameter that is crucial in rejecting outliers was also introduced.

In S. Peleg and J. herman. *Panoramic mosaics by manifold projection* IEEE Conference on Computer Vision and Pattern Recognition, 1997 Peleg and Herman described a method of creating panoramic mosaics from video sequences using manifold projection. Image alignment is computed using image-plane translations and rotations only, therefore this method performs fairly efficiently.

Irani and Anandan in *Video indexing based on mosaic representations.* Proceedings of the IEEE, 86(5):905-921, 1998 presented an approach to constructing panoramic scene representation from sequential and redundant video. This representation provides a snapshot view of the information available in the video data. Based on it, two types of indexing methods using geometric and dynamic scene information were also proposed as a complement to the traditional, appearance-based indexing methods.

As discussed above, image registration, i.e. establishing the correspondence between images, is one of the most computationally intensive stages for the problem of panorama. If we bypass this process, the problem can be simplified considerably. Fortunately, MPEG video has pre-encoded macroblock based motion vectors that are potentially useful for image registration, as discussed in more detail next.

MPEG (MPEG1, MPEG2 and MPEG4, the acronym stands for "Motion Picture Experts Group") is a family of motion prediction based compression standards. Three types of pictures, I, P and B-pictures are defined by MPEG. To aid random access and enable a limited degree of editing, sequences are coded as concatenated Groups of Pictures (GoP) each beginning with an I-picture. FIG. 3 shows an example of a GoP and the forward/backward motion prediction used in MPEG encoding.

An I-picture is coded entirely in intra mode which is similar to JPEG. That is, an encoded I picture contains all the data necessary to reconstruct the picture independently from any other frame, and hence these constitute entry points at which the compressed form can be entered and decoding commenced. Random access to any picture is by entering at the previous I-picture and decoding forwards.

A P-picture is coded using motion prediction from the previous I or P-picture. A residual image is obtained using motion compensation, and is then coded using Discrete Cosine Transform (DCT) and Variable Length Coding (VLC). Motion vectors are then computed on the basis of 16×16 macroblocks with half pel resolution. These motion vectors are usually called forward motion vectors.

A B-picture is coded similarly to a P-picture except that it is predicted from either the previous or next I or P-picture or from both. It is the bidirectional aspect which gives rise to the term B-picture. Therefore both the forward (from the previous frame) and backward (from the future frame) motion vectors may be contained in a B-picture. The arrows on FIG. 3 illustrate which motion vectors are contained in which frame (the notation convention in FIG. 3 is that the vectors are contained in the frame at which the arrowhead points), and by way of example it can be seen that the I-frame I1 has no motion vectors; the B-frame B2 has a set of forward motion vectors from I1 and backward motion vectors to P4; the B-frame B3 also has a set of forward motion vectors from I1 and backward motion vectors to P4; and the P-frame P4 has a single set of forward motion vectors from I1. As a matter of terminology, within this specification we refer to the frame from or to which a set of motion vectors contained within another frame relate as the "anchor frame" for that other frame. Thus, as an example, the anchor frame for P4 in FIG. 3 is I1, as it is I1 to which the forward motion vectors in P4 relate. In MPEG standards, only I- and P-frames can be anchor frames. B-frames may have two different anchor frames, one for each of the sets of forward and backward motion vectors respectively.

Example forward and backward motion vectors from a real MPEG encoded video sequence are illustrated in FIGS. 5 and 6. More particularly, FIG. 5 shows a decoded B-frame taken from an MPEG video sequence of the football match mentioned earlier. Overlaid over the image is a graphical representation of the forward motion vectors encoded within the B-frame for each macroblock of the image. The direction and length of the lines gives an indication of the direction and magnitude of the motion vector for each macroblock. In FIG. 6 the overlaid lines represent the backward motion vectors for each macroblock.

From FIGS. 5 and 6 it will be seen that generally most of the motion vectors are of substantially the same magnitude and direction, and hence are indicative that the majority of motion within the image is a global motion caused by a panning of the camera from right to left. However, some of the motion vectors are clearly in error, being either of too large a magnitude with respect to their adjacent vectors, being in the wrong direction, or with a combination of both deficiencies. It is the presence of these "bad" motion vectors which complicates the problem of motion estimation directly from the motion vectors. This is one of the problems which an aspect of example embodiments of the present invention addresses.

Turning to a related topic, it is also important to note that the length of a GoP and the order of I, P and B-pictures are not defined by MPEG. A typical 18-picture GoP may look like IBBPBBPBBPBBPBBPBB. As I-pictures are entirely intra-coded, the motion continuity in a MPEG video may be broken at an I-picture. However, if the immediate preceding frames before the I-picture are one or more consecutive B-pictures and at least one of the B-pictures is coded with backward motion prediction, the motion continuity can be maintained. This is illustrated in FIG. 4, wherein GoP 1 ends with a B frame which contains a set of backward motion vectors relating to the I-frame of GoP 2, and hence motion continuity from GoP 1 to GoP 2 can be maintained upon decoding and reproduction. However, it will be seen that GoP 2 ends with a P-frame which does not contain any backward motion vectors relating to the I-frame of GoP 3, and hence motion continuity between GoP 2 and GoP 3 cannot be maintained.

It is interesting to note that MPEG encoded video has been widely available as both live stream and static media storage in many applications such as teleconferencing, visual surveillance, video-on-demand and VCDs/DVDs. For this reason, there has been considerable effort in the research on MPEG domain motion estimation, as outlined next.

Meng and Chang in *CVEPS—a compressed video editing and parsing system* ACM Multimedia, 1996 describe a compressed video editing and parsing system (CVEPS). A 6-parameter affine transformation was employed to estimate the camera motion from the MPEG motion vectors. Moving objects can then be detected by using global motion compensation and thresholding. However, the camera motion is computed using a least squares algorithm, which is not robust to the "noisy" MPEG motion vectors although the authors realised the problem and adopted a kind of iterative noise reduction process.

Tan et al. in *Rapid estimation of camera motion from compressed video with application to video annotation* IEEE Transactions on Circuits and Systems for Video Technology, 10(1):133-146, 2000 present a method to estimate camera parameters such as pan rate, tilt rate and zoom factor from the MPEG motion vectors encoded in the P-pictures using least squares method. An application of using these parameters for sports video annotation such as wide-angle and close-up is also illustrated.

In Pilu, M. *On using raw mpeg motion vectors to determine global camera motion* SPIE Electronic Imaging Conference, San Jose, 1998 there is reported a method to estimate global camera motion and its application to image mosaicing. The MPEG motion vectors in P-pictures and B-pictures were used to fit a 6-parameter affine transformation model. Texture based filtering was adopted to reduce the influence of noisy motion vectors which mostly appear at low-textured macroblocks. The author also mentioned the idea of using robust methods as a potential solution to eliminate the effect of outlying motion vectors.

Jones et al. in *Building mosaics using mpeg motion vectors* ACM Multimedia, 1999. presented an approach to image mosaicing from video, where individual frames are aligned to a common cylindrical surface using the camera parameters such as pan, tilt and zoom estimated from MPEG motion vectors.

Finally, in A. Smolic, M. Hoeynck, and J.-R. Ohm *Low-complexity global motion estimation from P-frame motion* vectors for MPEG-7 application IEEE International Conference on Image Processing, Vancouver, Canada, September 2000 Smolic et al. presented an algorithm for low complexity global motion estimation from MPEG motion vectors from P-pictures. To deal with the outlier motion vectors, a robust M-estimator with a simplified influence function is applied. However, it seems that the parameters of the influence function, which are most important to the robustness of the algorithm, have to be determined empirically.

Thus, global motion estimation from MPEG motion vectors has been performed previously, but problems have been encountered with the amount of noise present in the MPEG motion vector information which have required elaborate solutions. This problem of noise in the motion vector information is one of the problems which example embodiments of the present invention intend to overcome.

SUMMARY

The example embodiments of the present invention provide a method and system which overcomes the noise present in inter-frame encoded motion vectors to allow for global motion estimations between frames to be performed. This is achieved by detecting motion estimation failure, and re-calculating motion estimations along a different route from the anchor frame to the particular frame in question. This is made possible by the realisation that bi-directional frames in a coding scheme such as MPEG contain both forward and backward motion vectors, and hence provide at least one alternative "route" following the motion vectors between frames from the particular frame to its anchor frame. Individual motion estimations can be made between each pair of frames on the route, and then the individual motion estimations accumulated to give an overall motion estimation. Thus, global motion estimation can be performed accurately for frames whose motion vectors are subject to high levels of noise in one direction, but not necessarily in another (in the case of B-frames), or for frames whose own motion vectors are too noisy, but for which there are motion vectors between the frame and another B-frame which are not too noisy (as in the case of P-frames).

In view of the above, from a first aspect there is provided a method of global motion estimation between frames of a motion-compensated inter-frame encoded video sequence, each inter-frame encoded frame of the sequence having a plurality of motion vectors encoded therein relating the frame to a preceding and/or succeeding frame of the sequence, the method comprising, for a particular frame:

a) determining a motion estimation representative of the global motion between the particular frame and its anchor frame on the basis of motion vectors therebetween;

b) determining one or more further motion estimations representative of the global motion between the particular frame and its anchor frame at least partially on the basis of motion vectors between the particular frame and one or more preceding or succeeding other frames; and c) selecting one of the motion estimations which meets at least one predetermined criterion as being representative of the global motion of the frame.

The first aspect provides the advantage that it allows multiple motion estimations to be generated if necessary, along different routes from the particular frame for which a motion estimation is being generated back to its anchor frame. This is useful in those cases where the motion vectors along one route are too noisy to give an accurate estimation, but the motion vectors on an alternative route are not as noisy.

Preferably, the determining step b) further comprises the steps of:

e) determining one or more motion estimations representative of the global motion of the frame with respect to one or more respective preceding or succeeding other frames;

f) determining one or motion estimations respectively representative of the global motion of the one or more other frames with respect to the anchor frame; and g) accumulating the respective motion estimations to give one or more respective overall motion estimations each substantially representative of the global motion of the frame with respect to the anchor frame. This makes use of the bi-directional nature of the motion vectors within MPEG B-frames such that the B-frames operate to provide the alternative routes.

In a preferred embodiment, the selecting step c) preferably further comprises testing the motion estimations in turn; and outputting a motion estimation as being representative of the global motion of the frame if it passes the test, wherein the test is applied in turn to motion estimations once they have been determined, and if the test is passed then no further motion estimations are determined. Thus in the preferred embodiment once a motion estimation has been found which passes the test, then no further motion estimations are determined along alternative routes, thereby minimising computation complexity. In other embodiments, however, motion estimations may be determined down every available route, and then the motion estimation with the smallest error is selected as the estimation representative of the global motion. In this case the error may be a least mean square error, or a least median squared error.

In the preferred embodiment, the test preferably comprises comparing the motion estimation with a threshold value, wherein the test is passed if the parameters of the motion estimation do not exceed the threshold value. The threshold value is predetermined in advance.

Moreover, within the preferred embodiment, if the test is failed, the method further comprises interpolating between the motion estimations of adjacent frames to give an interpolated motion estimation which is then output as the motion estimation representative of the global motion of the frame. Thus where all the available motion estimations along each different route fail, interpolation can be used to give a motion estimation which can be used as an output for the frame.

In addition to the above, from a second aspect example embodiments of the present invention also provide a method of generating panoramic images from a motion-compensated inter-frame encoded video sequence, the method comprising:

for each frame of the sequence, determining the global motion of each frame with respect to its anchor frame using the method of any of the first aspect; and generating at least one panoramic image representing the frames of the video sequence using the global motion estimations thus determined.

Thus the second aspect of example embodiments of the invention allows panoramic images to be generated using the global motion estimations provided by the first aspect. As the global motion estimations are substantially accurate, the panoramic images produced by the second aspect are of improved quality with respect to some prior art images.

Preferably, within the second aspect the generating step further comprises:

selecting a particular frame of the sequence as a reference frame, the plane of the reference frame being a reference plane;

for each frame other than the reference frame, accumulating the global motion estimations from each frame back to the reference frame;

warping each frame other than the reference frame onto the reference plane using the accumulated global motion estimations to give one or more pixel values for each pixel position in the reference plane; and for each pixel position in the reference plane, selecting one of the available pixel values for use as the pixel value in the panoramic image.

Preferably, the selecting step comprises selecting a substantially median pixel value from the available pixel values for use in a background panoramic image, and/or selecting a substantially most different pixel value from the available pixel values for use in a foreground panoramic image. We have found that the selection of such pixels gives improved results.

Preferably, within the embodiments the selecting step comprises:

calculating the mean pixel value of the available pixel values;

calculating the L1 distance between each available pixel value and the calculated mean pixel value; and selecting the pixel value with the median L1 distance for use in a background panoramic image and/or selecting the pixel value with the maximum L1 distance for use in a foreground panoramic image. Thus all of the available pixel values for a particular pixel position are compared, and the pixel value with the median L1 distance from the mean pixel value selected for the background, whilst the pixel value with the maximum L1 distance from the mean pixel value is selected for the foreground. We have found such a selection of pixels to give an improved result.

From a third aspect, example embodiments of the present invention also provide a system for global motion estimation between frames of a motion-compensated inter-frame encoded video sequence, each inter-frame encoded frame of the sequence having a plurality of motion vectors encoded therein relating the frame to a preceding and/or succeeding frame of the sequence, the system comprising:

video processing means arranged in use to:
i) determine a motion estimation representative of the global motion between the particular frame and its anchor frame on the basis of motion vectors therebetween;
ii) determine one or more further motion estimations representative of the global motion between the particular frame and its anchor frame at least partially on the basis of motion vectors between the particular frame and one or more preceding or succeeding other frames; and a motion estimation selector means arranged in use to select one of the motion estimations which meets at least one predetermined criterion as being representative of the global motion of the frame.

Moreover, from a fourth aspect there is also provided a system for generating panoramic images from a motion-compensated inter-frame encoded video sequence, comprising:

a system for global motion estimation between frames of a motion-compensated inter-frame encoded video sequence as described above in the third aspect, and further arranged to provide global motion estimations for each frame; and panoramic image generating means for generating at least one panoramic image representing the frames of the video sequence using the global motion estimations thus determined.

Within both the third and fourth aspects of example embodiments of the invention, corresponding further features and advantages as already described above in respect of the first and second aspects may respectively be provided.

From a fifth aspect, example embodiments of the present invention also provide a computer program or suite of programs arranged such that when executed on a computer system the program or suite of programs causes the computer system to perform the method of any of the first or second aspect. Moreover, from a further aspect there is also provided a computer readable storage medium storing a computer program or suite of programs according to the fifth aspect. The computer readable storage medium may be any suitable data storage device or medium known in the art, such as, as a non-limiting example, any of a magnetic disk, DVD, solid state memory, optical disc, magneto-optical disc, or the like.

BRIEF DESCRIPTION OF THE DRAWINGS

Further features and advantages of example embodiments of the present invention will become apparent from the following description of an embodiment thereof, presented by way of example only, and with reference to the accompanying drawings, wherein like reference numerals refer to like parts, and wherein.

DESCRIPTION OF THE EMBODIMENT

There follows a description of an embodiment of the invention. As the preferred embodiment of the invention is implemented in software on a computer system, we first describe a general purpose computer system which provides the operating environment for such software. There then follows a description of the various programs provided by the embodiment of the invention, followed by a description of the processing performed by such programs. Finally, some example results generated by the embodiment are given.

Figure 7:
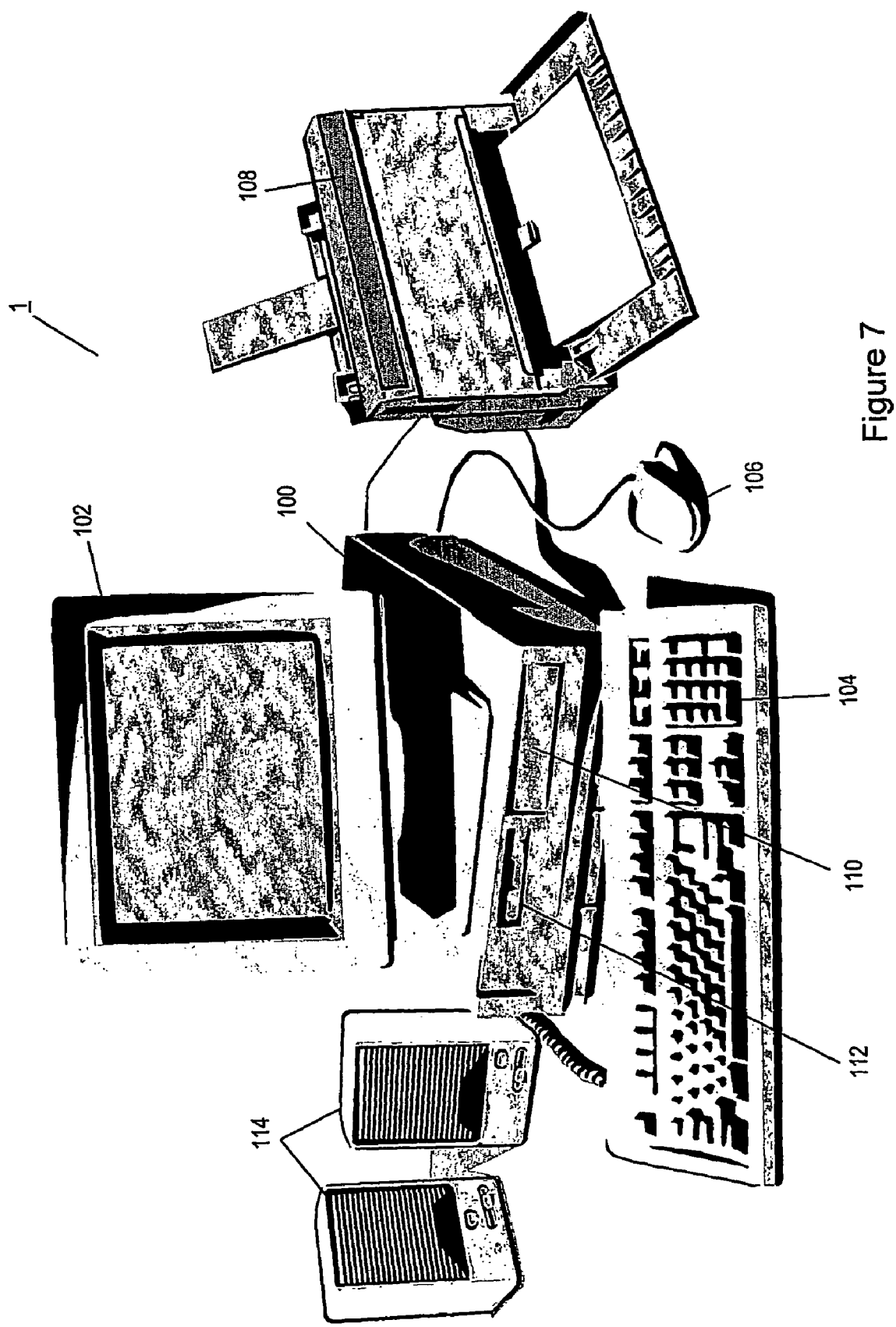
FIG. 7 is an illustration of a computer system which may form the operating environment of example embodiments of the present invention.

FIG. 7 illustrates a general purpose computer system which provides the operating environment of the embodiment of the present invention. Later, the operation of example embodiments of the invention will be described in the general context of computer executable instructions, such as program modules, being executed by a computer. Such program modules may include processes, programs, objects, components, data structures, data variables, or the like that perform tasks or implement particular abstract data types. Moreover, it should be understood by the intended reader that example embodiments of the invention may be embodied within other computer systems other than those shown in FIG. 7, and in particular hand held devices, notebook computers, main frame computers, mini computers, multi processor systems, distributed systems, mobile telephones, and the like. Within a distributed computing environment, multiple computer systems may be connected to a communications network and individual program modules of example embodiments of the invention may be distributed amongst the computer systems.

With specific reference to FIG. 7, a general purpose computer system 1 which may form the operating environment of the embodiment of an invention, and which is generally known in the art comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 7 illustrates an exemplary embodiment only, and that other configurations of computer systems are possible which can be used with example embodiments of the present invention. In particular, the base chassis unit 100 may be in a tower configuration, or alternatively the computer system 1 may be portable in that it is embodied in a lap-top or note-book configuration. Other configurations such as personal digital assistants or even mobile phones may also be possible.

Figure 8:
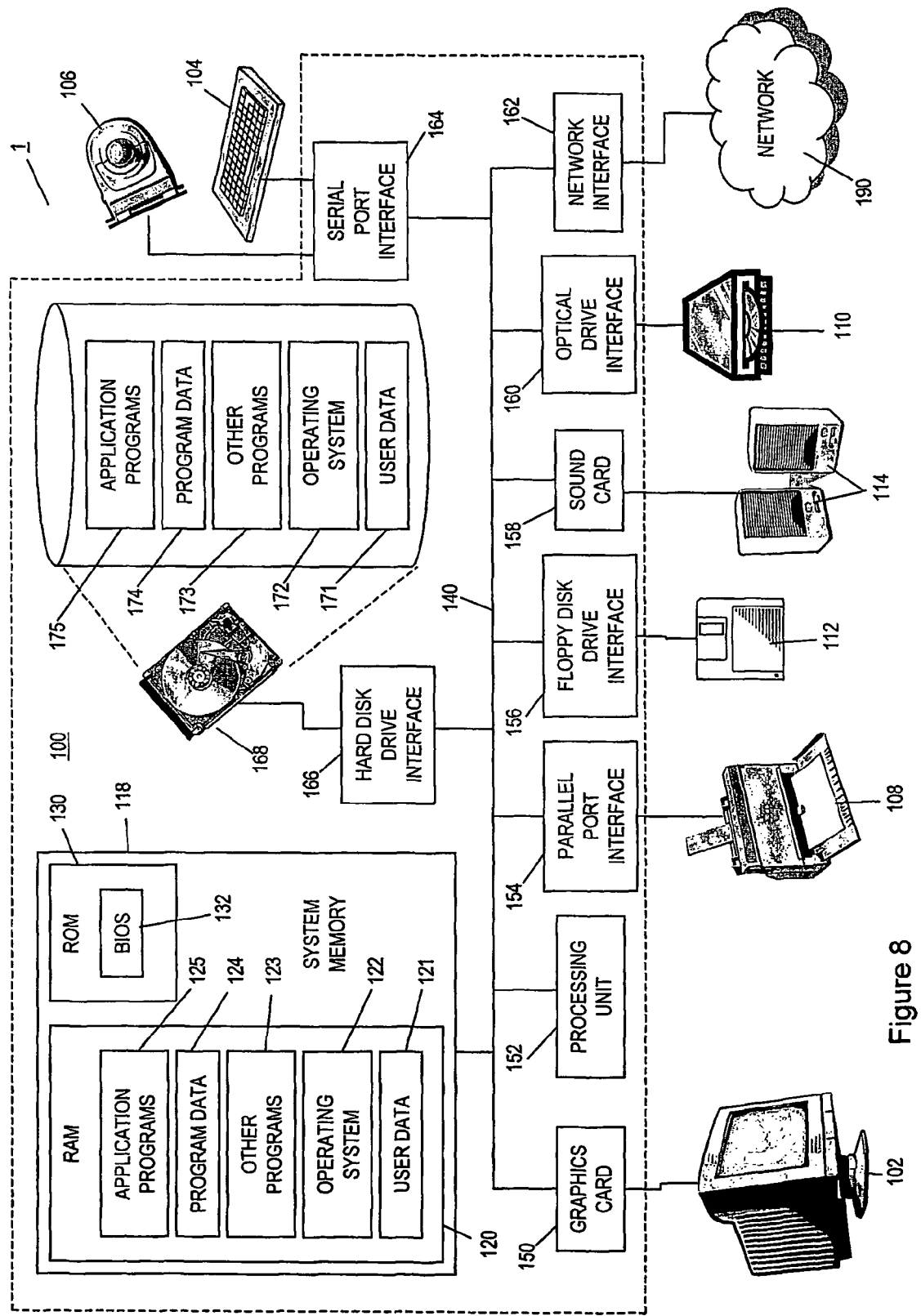
FIG. 8 is a system architecture block diagram of the computer system of FIG. 7.

FIG. 8 illustrates a system block diagram of the system components of the computer system 1. Those system components located within the dotted lines are those which would normally be found within the chassis unit 100.

Figure 1:
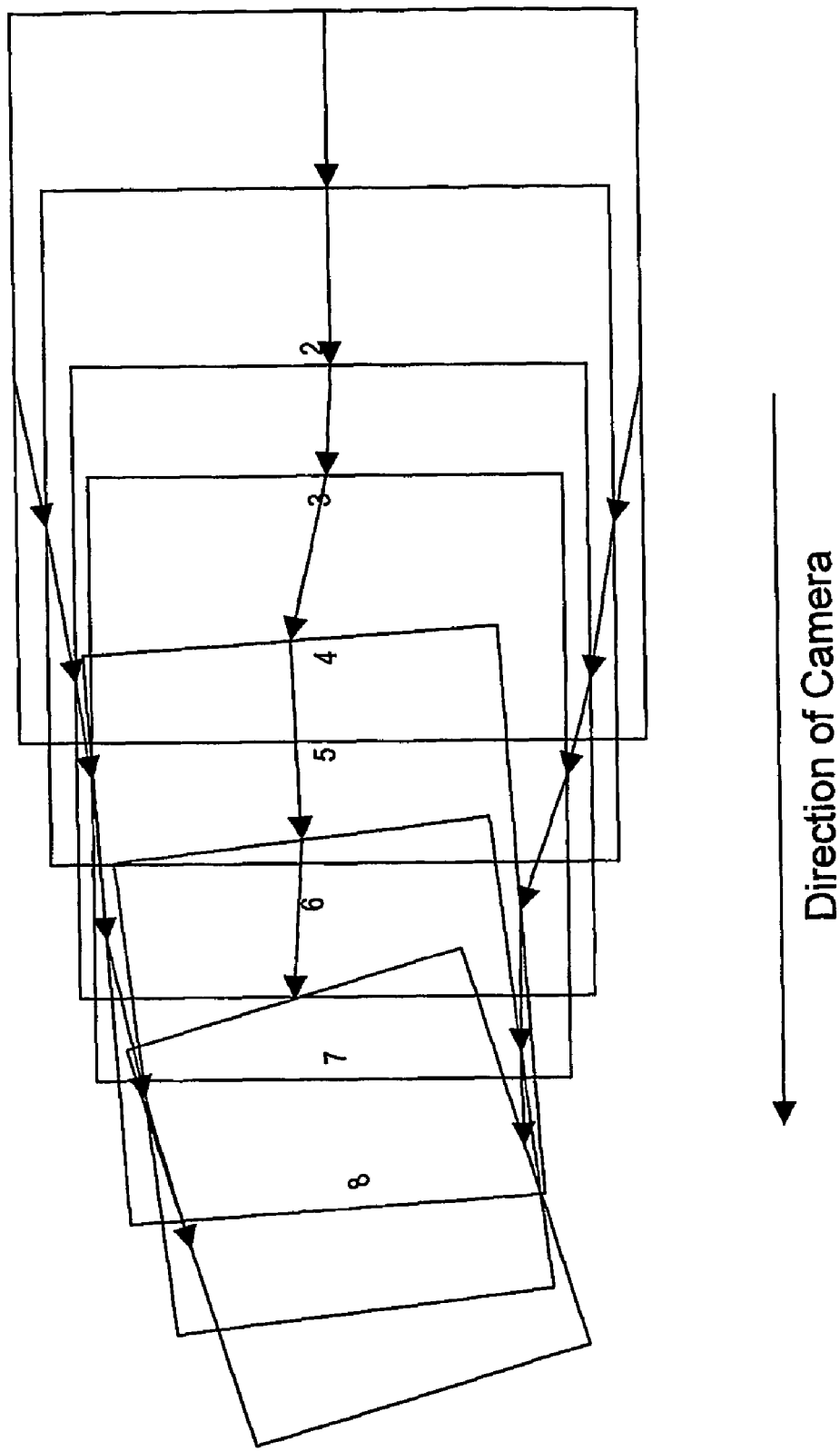
FIG. 1 is a diagram showing multiple frames can form a panoramic image.
Figure 2:
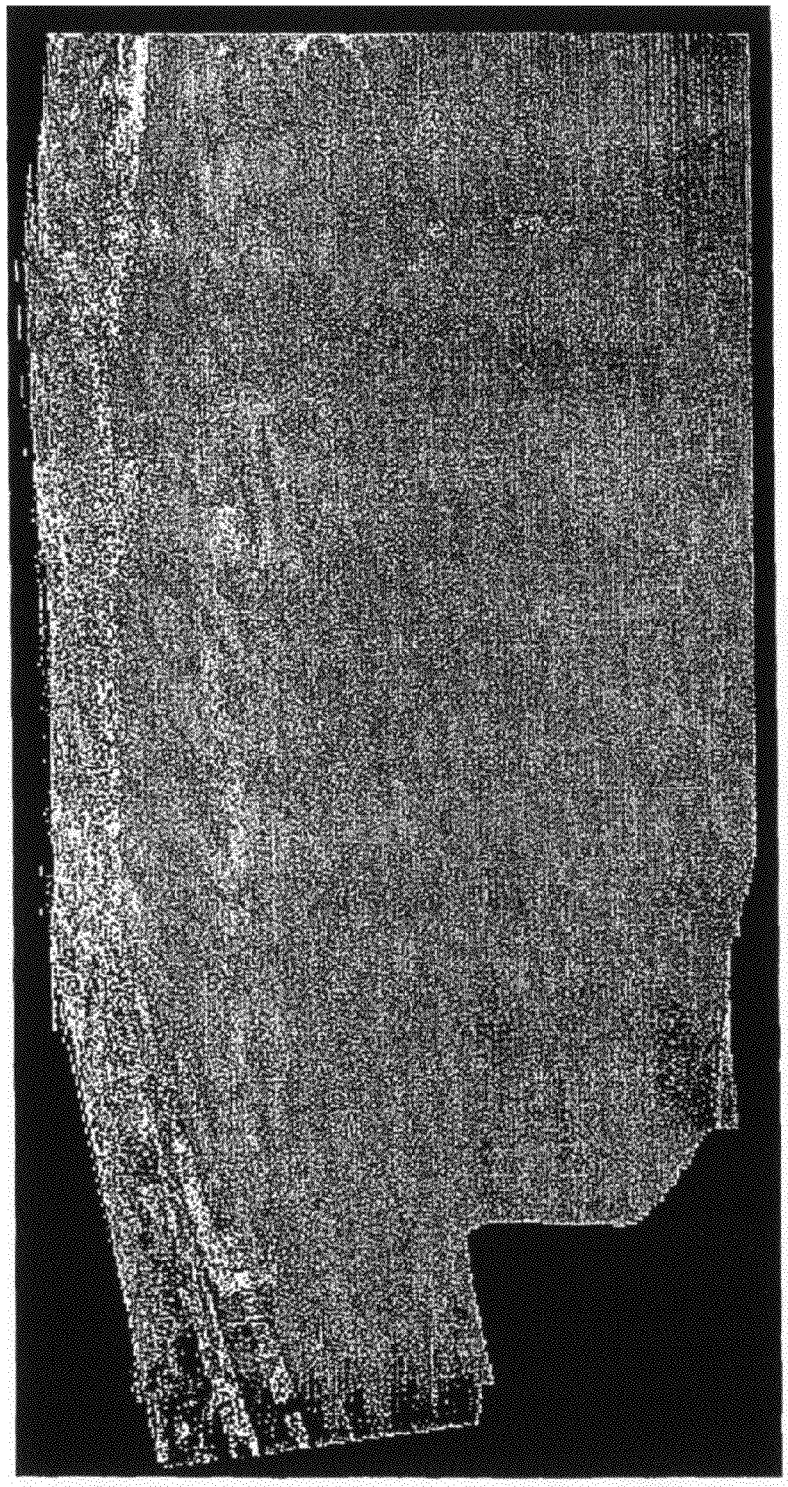
FIG. 2 is an example background panorama generated using a prior art technique.

With reference to FIG. 2, the internal components of the computer system 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer system 1 to communicate with other computer systems over a network 190. The network 190 may be a local area network, wide area network, local wireless network, or the like. The network interface 162 allows the computer system 1 to form logical connections over the network 190 with other computer systems such as servers, routers, or peer-level computers, for the exchange of programs or data.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft® Windows®, Linux™, Unix™, or the like, as well as user data in the form of files, data structures, or other data 171. The hard disk drive 168 provides non volatile storage of the aforementioned programs and data such that the programs and data can be permanently stored without power. The specific programs required by the embodiment of the invention and stored on the hard disk drive 168 will be described later.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Whilst FIG. 8 illustrates one embodiment of the invention, it will be understood by the skilled man that other peripheral devices may be attached to the computer system, such as, for example, microphones, joysticks, game pads, scanners, or the like. In addition, with respect to the network interface 162, this may be a wireless LAN network card, or GSM cellular card, although equally it should also be understood that the computer system 1 may be provided with a modem attached to either of the serial port interface 164 or the parallel port interface 154, and which is arranged to form logical connections from the computer system 1 to other computers via the public switched telephone network (PSTN).

Where the computer system 1 is used in a network environment, it should further be understood that the application programs, other programs, and other data which may be stored locally in the computer system may also be stored, either alternatively or additionally, on remote computers, and accessed by the computer system 1 by logical connections formed over the network 190.

Figure 9:
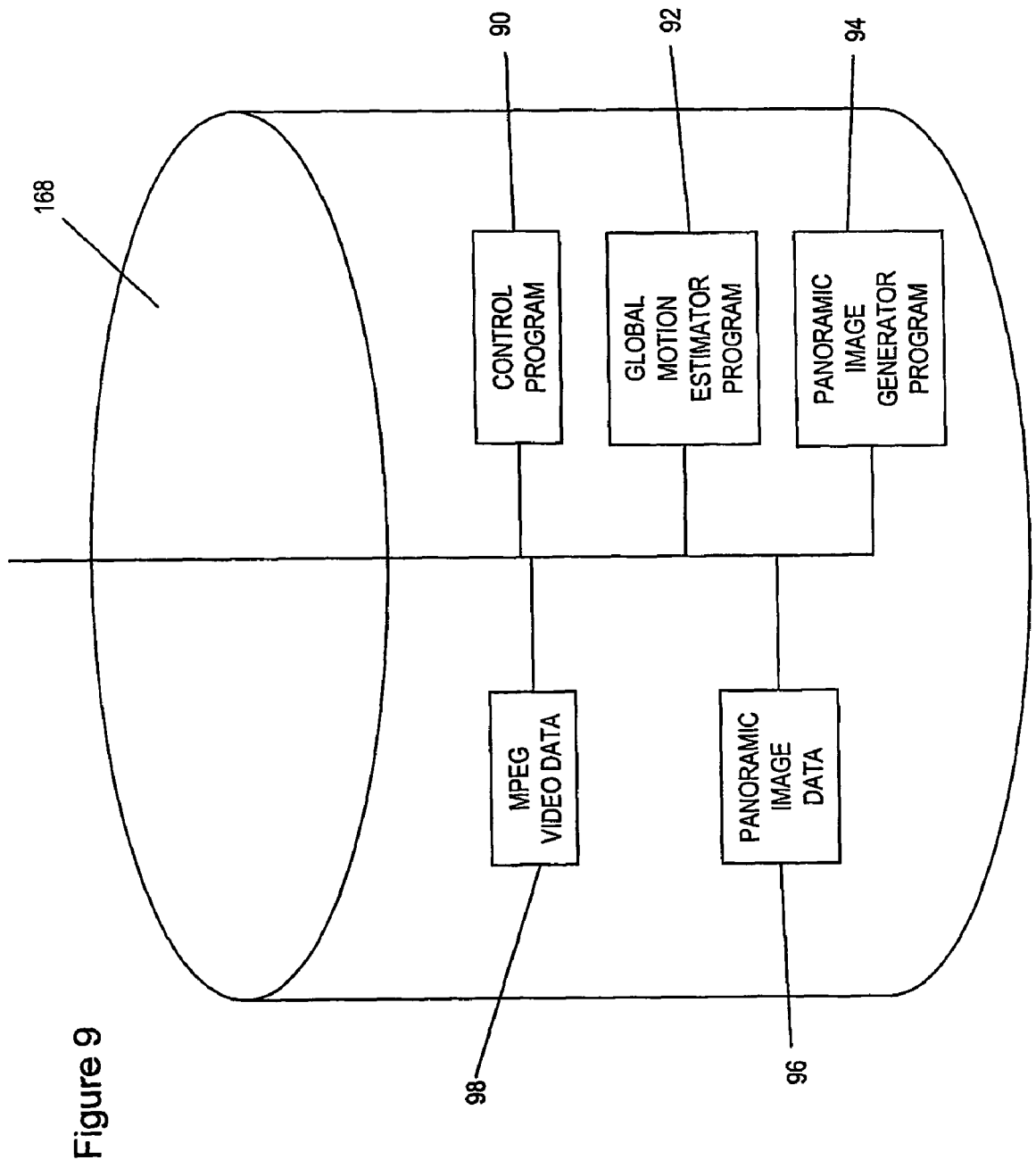
FIG. 9 is an illustration of a storage device in the computer system, storing programs used in the embodiment of the invention.

Turning now to FIG. 9, this illustrates the hard disk drive 168 in block diagram form so as to enable illustration of the programs and data provided by the embodiment of the invention and which are stored thereon. More particularly, there is first provided a control program 90, which acts when executed to control the overall operation of the system, to call and oversee the operation of the other programs, and to provide a user interface to allow a user to control the overall operation of the embodiment. Examples of the operations performed by the control program 90 are such things as allowing a user to enter the file name of an MPEG video sequence which is to be processed, decoding and displaying the MPEG sequence to the user and allowing the user to specify which parts of the sequence are to be created into a panorama. In addition, basic program control commands such as Start, Stop, Suspend, and the like are also provided by the control program 90 as part of the user interface to the system.

In addition there is also provided a global motion estimator program 92, which acts to take a video sequence as an input under the command of the control program 90, and to process the frames of the sequence so as to generate transformation parameters for each frame indicative of the global motion between each frame and its respective anchor frame. The transformation parameters may then be stored for each frame if necessary. In addition the global motion estimator program may also be run under the control of a panoramic image generator program 94 (described next), to calculate transformation parameters for frames passed to the program from the panoramic image generator program.

The panoramic image generator program 94 acts under the command of the control program 90 to take a video sequence as input (the sequence having been indicated to the control program 90 by a user), and to generate a panoramic image of the indicated sequence. It should be noted here that: a single panoramic image can be generated for each sequence in which there is continuous motion, that is, for each individual "shot" or "edit" in the sequence. Each shot may contain multiple Groups of Pictures, and preferably each GoP ends with a B-frame to allow the global motion of the following I frame to be estimated. This is not essential, however, as where a GoP does not end with a B-frame the other techniques such as interpolation can be used to estimate a global motion estimation for the I-frame.

Once the panoramic image generator program has generated a panoramic image from the indicated sequence, the generated image is stored in a panoramic image data area 96 of the hard disk. The panoramic images may then be accessed and displayed by any suitable imaging applications as appropriate.

Finally, the hard disk drive 168 also has an area 98 in which is stored the original MPEG video data in the form of MPEG files which are used as input to the system.

Figure 10:
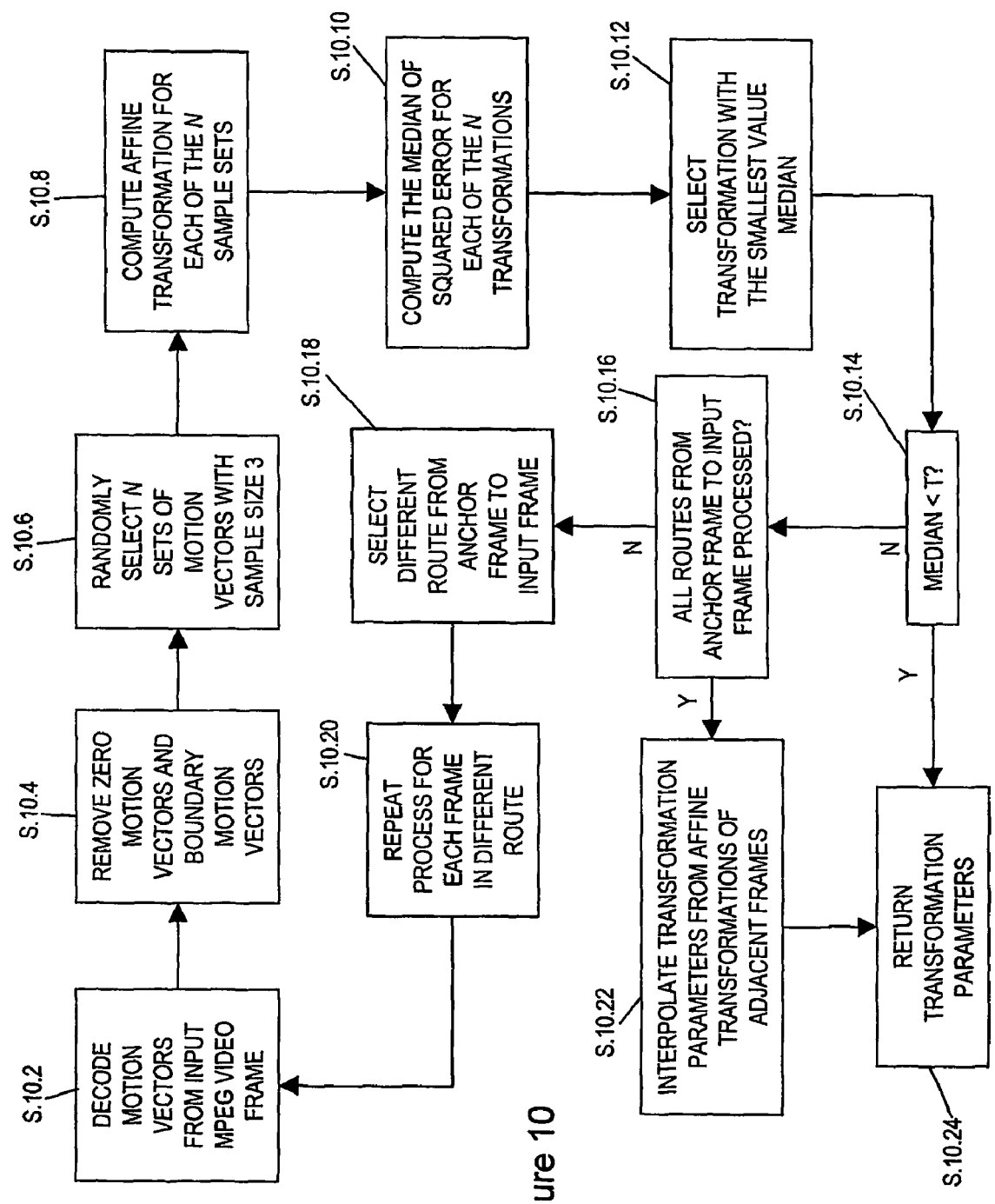
FIG. 10 is a flow diagram of an embodiment of a global motion estimation method according to one aspect of example embodiments of the invention.

Having described the individual programs provided by the embodiment, the detailed operation of the global motion estimator program 92 will now be described with reference to the flow diagram of FIG. 10. It should be noted that the global motion estimator program 92 can be executed independently so as to simply-produce global motion estimations for whatever use, or can be called by the panoramic image generator program 94 as part of its own operation. The following description assumes that the global motion estimator program has been launched independently.

As a prelude to the operation of the global motion estimator program, a human user would first use the control program 90 to select an MPEG video sequence for processing, and to command that it be subject to global motion estimation. Then, the control program 90 launches the global motion estimator program 92, and passes the program the MPEG encoded video sequence with an indication of for which frame or frames the global motion estimator program is to calculate the transformation parameters representative of the global motion in the indicated frame or frames. Where multiple frames are indicated, the global motion estimator program processes each frame in turn.

After receiving a frame as input, the global motion estimator program 92 then commences its processing at step 10.2, by decoding the motion vectors from the input frame. In the case of a P-frame there will only be forward motion vectors from the previous I-frame or P-frame. In the case of B-frames, there will be both forward and backward motion vectors, and both sets are decoded. Initially, however, only the set of forward motion vectors are used at first.

Figure 6:
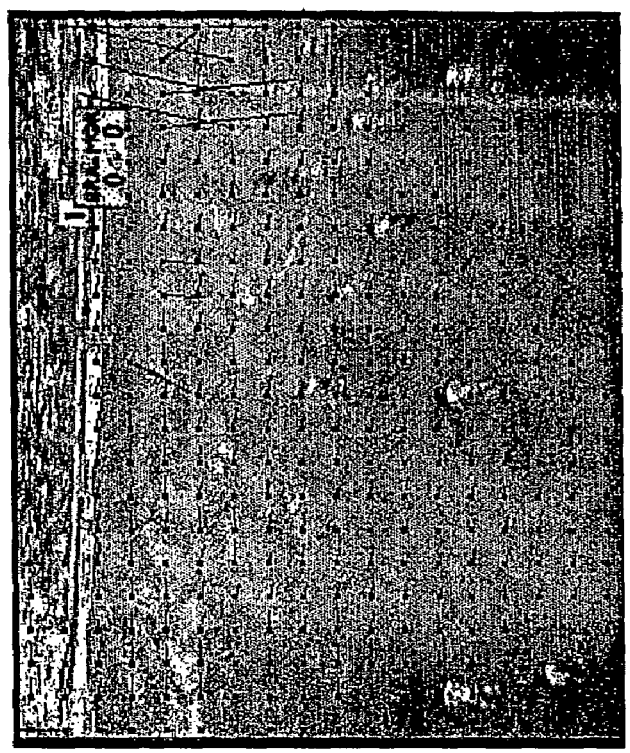
FIG. 6 is the decoded B-frame of FIG. 5 graphically illustrating the backward motion vectors encoded therein.
Figure 5:
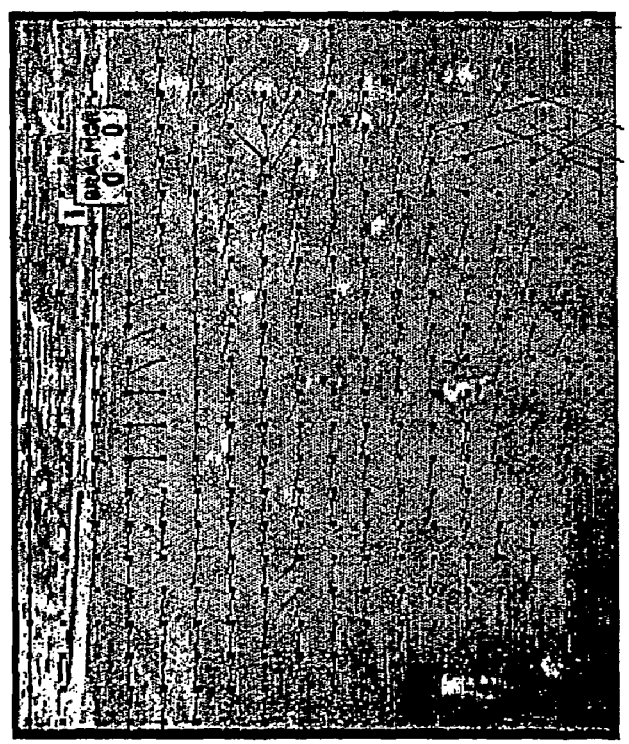
FIG. 5 is a decoded B-frame graphically illustrating the forward motion vectors encoded therein.

Following step 10.2, at step 10.4 the set of decoded motion vectors is subject to some filtering, in that those motion vectors with a zero value and those motion vectors located substantially at the boundaries of an image are removed. To demonstrate the necessity of this filtering for global motion estimation from MPEG video, the reader is referred once again to the sets of typical motion vectors from a B-frame in a football video as shown in FIGS. 5 and 6. As these images are taken from a long distance and contain a dominant static ground-plane, most motion vectors reflect the global camera motion. However, a few motion vectors look different from the majority owing to the foreground object motion or MPEG encoding efficiency. These extraordinary motion vectors should be treated as outliers for global motion estimation. It is important to note that, as shown in FIGS. 5 and 6, the outlier vectors are more likely to have large magnitudes, therefore may easily skew the solution from the desired one if they are not dealt with appropriately. Therefore, the vectors substantially at the boundaries of the image are removed, as these are more likely to be outlier vectors. With respect to the zero vectors, these are excluded as they usually do not specify a static macroblock in MPEG.

Note that we have found that it is preferable to exclude both zero vectors and boundary vectors, but that in other embodiments only one or other or neither of these classes of vectors need be removed.

Following step 10.4, at step 10.6 the global motion estimator program acts to control the computer system to randomly select N sets of motion vectors, each set having 3 motion vectors therein. The reason for this step (and indeed for several of the subsequent steps) is as follows:

There are basically two types of motion in a video sequence: the global camera motion and the local object motion. Given a MPEG video clip with a dominant static background, most of the MPEG motion vectors may appear to reflect the global camera motion. Although these MPEG motion vectors are encoded on the purpose of video compression and may not be the "real" motion vectors, we would argue that, given a MPEG video with reasonable image and compression quality, the MPEG motion vectors are most likely to reflect the underlying motion in a video. Therefore it is possible to estimate the global motion from MPEG motion vectors.

We assume the global motion can be modelled as, but not limited to, a 6-parameter affine transformation given by $$\begin{bmatrix} x' \\ y' \end{bmatrix} = \begin{bmatrix} a_1 & a_2 \\ a_3 & a_4 \end{bmatrix} \begin{bmatrix} x \\ y \end{bmatrix} + \begin{bmatrix} b_1 \\ b_2 \end{bmatrix} \quad (1)$$

where $(x, y)^T$ and $(x', y')^T$ are the 2D positions before and after transformation, and $a_1, a_2, a_3, a_4, b_1, b_2$ are parameters of the affine transformation. When more than 3 motion vectors between two frames are available, this transformation can be estimated using a least squares method. Denote the parameters of the affine transformation as a column vector $$a=(a_1, a_2, b_1, a_3, a_4, b_2)^T \quad (2)$$

For the training vectors pair $(x_i, y_i)^T$ and $(x_i', y_i')^T$, we define $$X_i = \begin{bmatrix} x_i & y_i & 1 & 0 & 0 & 0 \\ 0 & 0 & 0 & x_i & y_i & 1 \end{bmatrix} \quad (3)$$

$$Y_i = \begin{bmatrix} x_i' \\ y_i' \end{bmatrix} \quad (4)$$

Then the least squares solution to this problem is given by $$a=(\Sigma_i X_i^T X_i)^{-1}(\Sigma_i X_i^T Y_i) \quad (5)$$

When all the affine transformations between any two consecutive frames are available, the whole video sequence can be warped to a reference frame, e.g. the first frame of the sequence, although other frames may also be used. A 2D position vector in the first frame, $x_0=(x_0, y_0)^T$ is transformed to $$x_n=f_n(x_{n-1}) \quad (6)$$

in the n-th frame, where $f_n$ is the affine transformation between the n-th and n-1-th frames given by (1). Thus the pixel value of $x_0$ in the first frame is taken as that of $x_n$ in the n-th frame.

Note that we have also experimented with a slightly complicated projective transformation with 8 parameters. However, the results are not better than the simple affine transformation (for example, larger distortion, image features like lines not aligned well, etc.), which indicate that complicated models may not be appropriate for the "noisy" MPEG motion vectors.

In view of the above within the embodiments of the invention we adopt the robust Least Median of Squares (LMedS) method described in P. J. Rousseeuw *Least median of squares regression* Journal of The American Statistical Association, 79:871-880, 1984 for the required global motion transformation estimation. The rationale of the method can be described as follows:

1. Randomly select N sets of data from all available training examples to fit the model, resulting in N candidate solutions;
2. Rather than using as much of the data as possible, each randomly selected data set only contains s data points, the minimum number sufficient to solve the problem;
3. The optimal solution is chosen as the one with the least median of squared error.

Given an expected proportion of outliers in the data ($\epsilon$, say) then we need to choose N sufficiently large to give a good probability (p, say) of having at least one set which does not contain an outlier. By simple probability it is easy to show that N can be calculated from the formula:

$$N=\log(1-p)/\log(1-(1-\epsilon)^s) \quad (7)$$

where p is the probability of at least one of the N random samples is free from outliers, $\epsilon$ is the expected proportion of outliers in the training data, i.e. the probability of a data point being an outlier, and s is the sample size. For our problem of affine motion estimation, the minimum sample size required is s=3, as mentioned earlier. Even if we make a very conservative decision by choosing p=0:99 and $\epsilon$=50%, we would work out as N=34 which is still feasible for good real-time performance. Therefore, at step 10.6 the global motion estimator program controls the computer to randomly select 34 sets of motion vectors from the available motion vectors remaining after the filtering step of 10.4. Each set has three motion vectors, being the minimum sample size required to compute the affine transformation parameters representative of the global motion for the frame. It should be noted that in other embodiments N may be a different number, depending on the values set for p and $\epsilon$.

Next, at step 10.8 the global motion estimator program controls the computer system to calculate the affine transformation for each of the N (in this case 34) sample sets, using the equations set out above. Thus N sets of affine transformation parameters are obtained.

Following step 10.8, at step 10.10 the program controls the computer to compute the median of squared error for each of the N transformations, and then next at step 10.12 the transformation with the smallest median value is selected as the transformation which is deemed representative of the global motion of the image. Subject to a test to be described next, this transformation is returned by the program as the global motion estimation for the particular frame being processed.

However, prior to returning the transformation parameters as output, a comparison is made of the median error value of the selected transform with a threshold value T at step 10.14 and it is only if the median error value is less than the threshold value that the selected transformation parameters are returned. The reason for performing this thresholding test is explained next.

The Least Median Squares (LmedS) method is very simple and does not need any prior knowledge of the problem. However, its main shortcoming is that when more than half of the training data are outliers, i.e. $\epsilon$>50%, the data point with the median value may be an outlier, and therefore the returned transform parameters would not represent the true global motion of the frame. In order to get around this problem we use the threshold T to determine a possible failure of the LMedS algorithm, i.e. if the optimal median of squares is larger than T, an estimation failure is raised. In this situation, various strategies may be employed to compute an alternative solution, as will be described later, suffice to say for the moment that if the median error is greater than the threshold then the transformation is discarded and the parameters are not output by the program.

One may think that determining the value of T would be tricky. However, it is important to point out that in many cases the unreliable estimations can be easily distinguished from the good ones. For example, a threshold T=18, which means less than 3 pixel's displacement in both horizontal and vertical direction is acceptable ($3^2+3^2$), proved to work fairly well in our experiments. In other embodiments T may take any value in an acceptable range of for example, 2 to 32, which represents a pixel displacement in the horizontal and vertical directions of between 1 and 4. This range may be extended further if a larger pixel displacement is acceptable.

As mentioned above, where the median error for the selected transformation is less than the threshold value then at step 10.24 the selected transformation's parameters are returned as the output of the global motion estimator program, and the program then ends. However if the selected transformation does not meet the threshold then processing proceeds to step 10.16, wherein an evaluation is made as to whether all the possible routes from the frame being processed back to the anchor frame for that frame have been processed. This step (and subsequent steps 10.18 and 10.20) are based on the inventors' realisation that the bidirectional nature of the motion vectors within the B-frames provide multiple global motion estimation routes from a frame back to its anchor frame, via one or more other frames. That is, if the motion vectors which directly relate the frame being processed to its anchor frame do not provide a transformation which meets the thresholding step described above, then the motion vectors between the frame being processed and another frame can, be used to compute the relative global motion estimation between the frame being processed and the other frame, and then the motion vectors between the other frame and the original anchor frame can be used to compute a global motion estimation between the other frame and the anchor frame. Having obtained these two respective estimations, the estimations can be accumulated to give an overall estimation of the global motion between the original frame being processed and the anchor frame.

Figure 3:
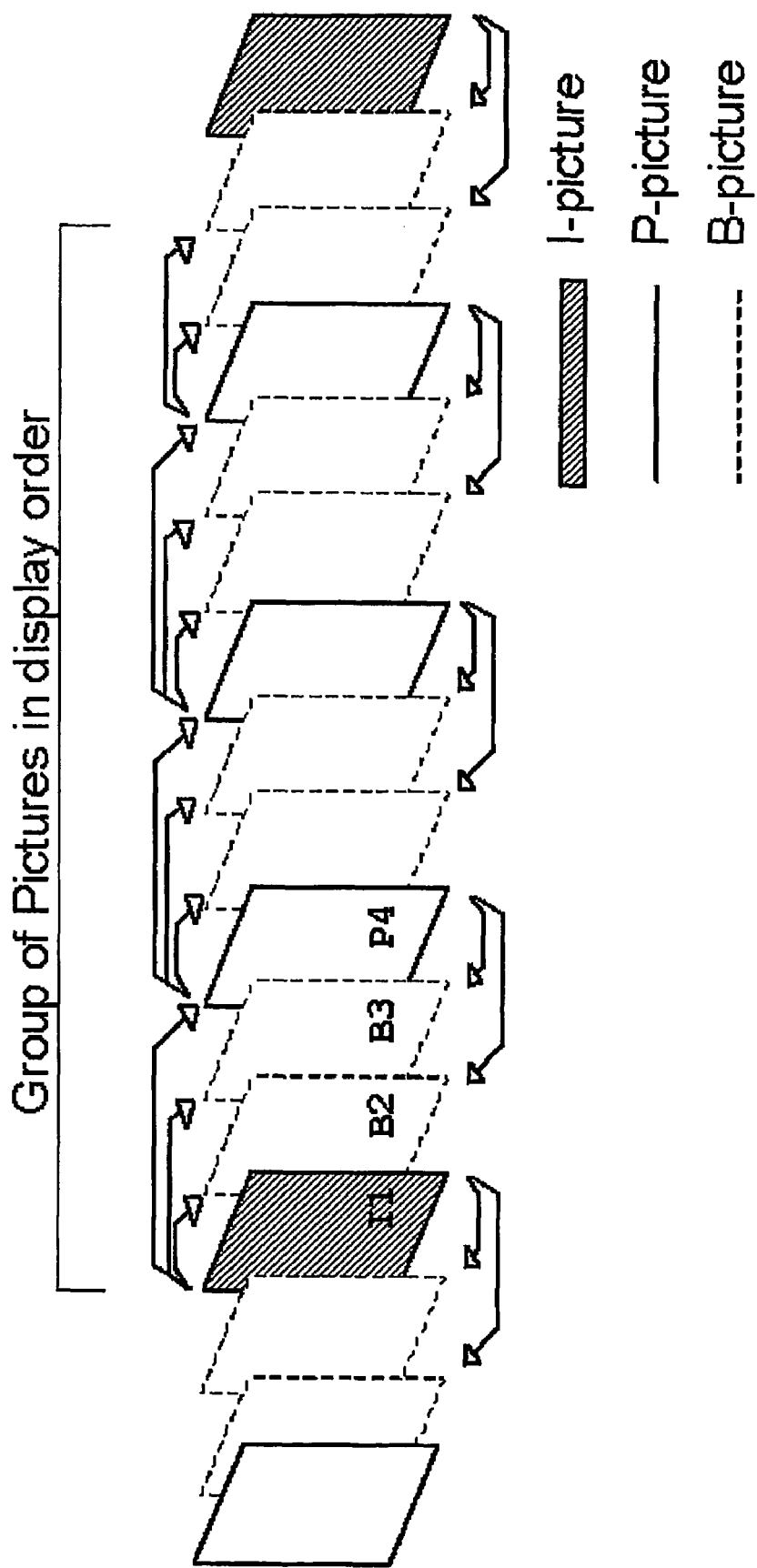
FIG. 3 is a diagram illustrating forward and backward motion vectors in an MPEG encoded video sequence.
Figure 4:
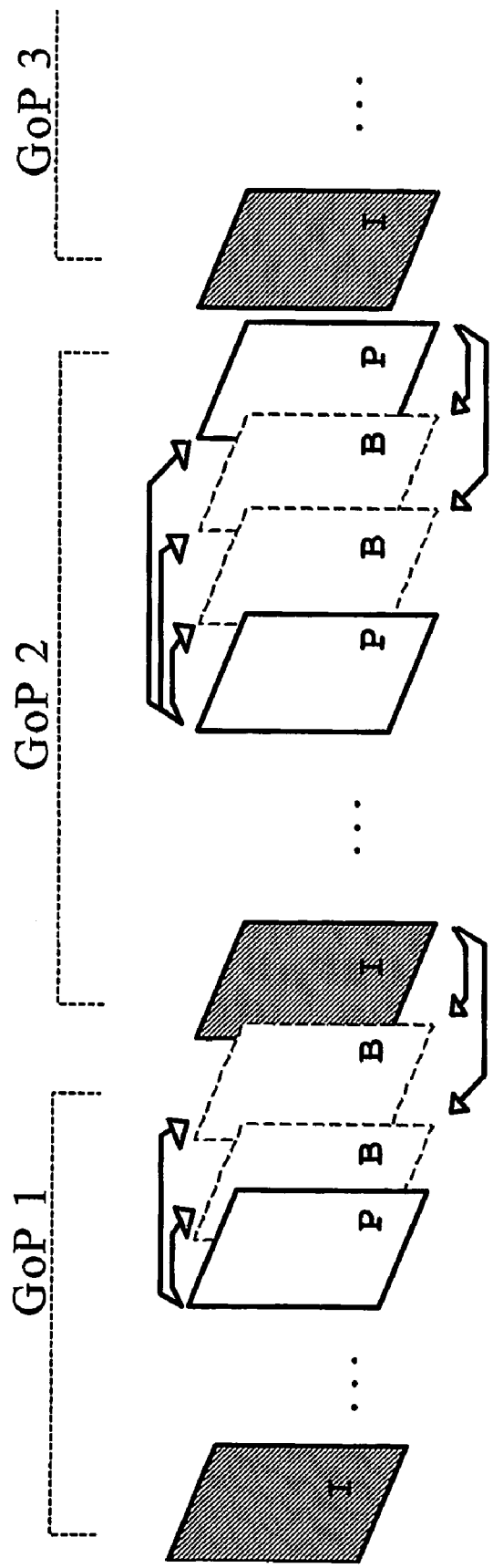
FIG. 4 is a diagram illustrating multiple Groups of Pictures (GoP) in an MPEG video sequence, and how motion continuity may be maintained between two GoPs.

As an example, consider FIG. 3. Here, there are three different routes from frame P4 to I1, being:
i) from P4 compute a global motion estimation back to the anchor frame I1 directly via the forward motion vectors contained in P4;
ii) from P4 use the backward motion vectors in frame B3 between P4 and B3 to obtain a global motion estimation between P4 and B3, and then use the forward motion vectors in B3 to obtain a global motion estimation between B3 and I1. The two estimations can then be accumulated to give an overall global motion estimation between P4 and I1; and
iii) from P4 use the backward motion vectors in frame B2 between P4 and B2 to obtain a global motion estimation between P4 and B2, and then use the forward motion vectors in B2 to obtain a global motion estimation between B2 and I1. The two estimations can then be accumulated to give an overall global motion estimation between P4 and I1.

In addition it will also be seen that there are also two routes from both B2 and B3 to I1: for B2 these are i) B2-I1 directly; and ii) B2-P4-I1. For B3 these are: i) B2-I1 directly and ii) B2-P4-I1. Thus, in most cases if it is impossible to obtain a reasonable motion estimation along one of the routes, we can still use a different route.

With respect to the order in which routes are selected, where an I-frame is being processed we first select its immediate preceding B-frame, and decode the backward motion vectors of this B-frame to estimate the global motion. If a failure is raised at step 10.14, we then select the second immediate preceding B-frame, and so on. For a P-frame, the order is its preceding anchor frame, first immediate preceding B-frame, second immediate preceding B-frame and so on. A B-frame is usually directly warped to its preceding anchor frame, but may be warped to its succeeding anchor frame if this produces better results than the warping to the preceding frame. Whether this is the case or not will depend upon the specific encoded video source data, but we found in our experiments that better results were achieved by warping B-frames back to the preceding anchor frame only. However, it should be noted that B-frames may also be warped via their succeeding anchor frames, and hence for any type of frame there are always multiple routes along which a global motion estimation may be found for the frame. Here are a few examples:

| I-frame | in $B_3B_2B_1$ I, | order $B_1B_2B_3$ |
| P-frame | in $IB_2B_1P$, | order $IB_1B_2$ |
| B-frames | in $IB_2B_1P$, | order IP |

Figure 12:
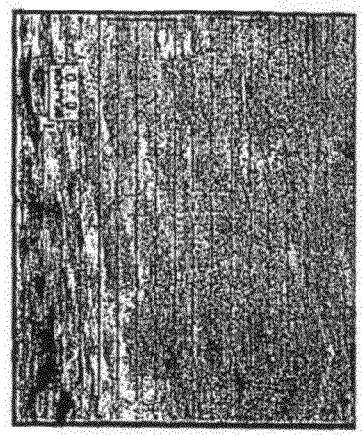
FIG. 12 is a decoded P-frame graphically illustrating the forward motion vectors encoded therein.
Figure 13:
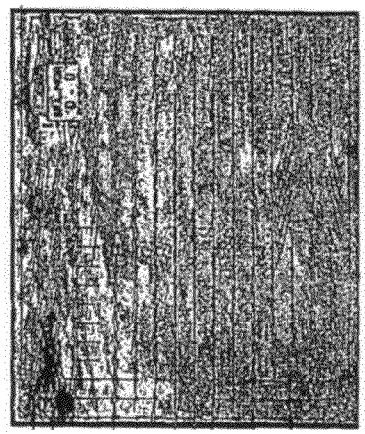
FIG. 13 is a decoded B-frame which immediately preceded the P-frame of FIG. 12, and which graphically illustrates the forward motion vectors encoded therein.
Figure 14:
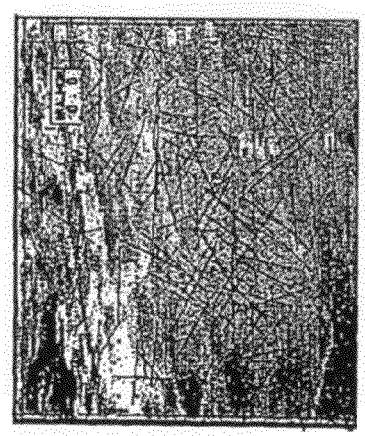
FIG. 14 is a decoded B-frame which immediately preceded the P-frame of FIG. 12, and which graphically illustrates the backward motion vectors encoded therein.
Figure 16:
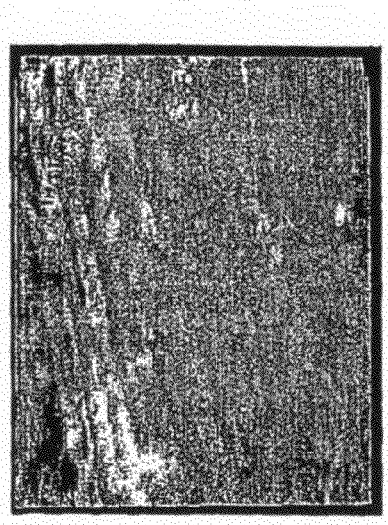
FIG. 16 is a panoramic image generated from the frames shown in FIGS. 12 to 14 using a the embodiment of the present invention.
Figure 15:
FIG. 15 is a panoramic image generated from the frames shown in FIGS. 12 to 14 using a prior art method.

FIGS. 12, to 16 demonstrate the situation of motion estimation along multiple routes. Here we processed frame numbers 144-147 (IBBP) of a video sequence to produce a panoramic image. Owing to fast motion, the forward motion vectors of frame 147 (P-frame) to the previous anchor frame (frame 144, I-frame) contain too many outliers for a reasonable estimation as shown in FIG. 12 More precisely, the least median of squared error Med=791.8, meaning that the threshold at step 10.14 was exceeded. This meant that we could not warp the current frame to its previous anchor frame directly. Fortunately both the backward and forward motion vectors in frame 146, its immediate preceding B-frame as shown in FIGS. 13 and 14, are sufficiently clean. Therefore we can warp the current frame to its previous anchor frame through two consecutive affine transformations estimated from the forward and backward motion vectors of that B-frame respectively (with Med=3.4 and Med=1.4 respectively). The panoramic images obtained by warping the 4 neighbouring frames to frame 144 using the direct route and indirect route are compared in FIGS. 15 and 16, with FIG. 15 being the image obtained using the direct transformation with the high median error, and FIG. 16 being the image obtained using the consecutive affine transformations of the indirect route for motion estimation for frame 147. Here, pixels in the panoramic images are computed as average values. It is clear that by using algorithm failure control and estimating the global motion along an alternative route we obtain a more accurate result and a slightly clearer image results.

In view of the above, and returning to FIG. 10, if the evaluation at step 10.16 returns a negative then not all of the available routes from the frame being processed back to it's anchor frame have been processed, and processing proceeds to step 10.18, wherein the next available route is selected in accordance with the route ordering described previously. Then, at step 10.20 the entire process is repeated for each frame in the new route. That is, the entire process of steps 10.2 to 10.14 is repeated to find the global motion transformation between the original frame and another frame, and then repeated again to find the global motion transformation between the other frame and the original anchor frame. If during these iterations of the process the found transformations do not meet the threshold value, then another route is selected and processing repeats again for that route. Once a cumulative transformation has been found which meets the threshold, however, the parameters of that transformation are returned at step 10.24, and processing then ends.

Of course, there are only a finite number of routes available between any particular frame and its anchor frame, and it may be that the transformations obtained by all the routes are defective in that they do not meet the threshold test. If this state is achieved then the evaluation at step 10.16 will return a positive result, and in such a case processing proceeds to step 10.22, where an interpolation is performed between the affine transformation parameters of adjacent frames to the frame being processed, to generate interpolated affine transformation parameters for the present frame. These interpolated affine transformation parameters are then output at step 10.24, and processing then ends.

In summary, therefore, the operation of the global motion estimation program 92 can be summarised as follows: Coarse macroblock motion vectors can be extracted from MPEG video with a minimal decompression. With a reasonable MPEG encoder, most motion vectors may reflect the complex motion in a video scene although they are coded for compression purposes. Based on this idea, motion estimation from MPEG motion vectors can be formulated as a robust parameter estimation problem which treats the "good" motion vectors as inliers and "bad" ones outliers. The global motion estimation program 92 uses motion vectors in both P and B-frames of an MPEG video for global motion estimation. A Least Median of Squares based algorithm is adopted for robust motion estimation, but it is also recognised that the bidirectional information in B-frames provides multiple routes to warp a frame to its previous anchor frame. In the case of a large proportion of outliers, we detect possible algorithm failure and perform re-estimation along a different route. Where all available routes fail a motion estimation can be obtained through interpolation.

Moreover, the global motion estimation program 92 may be operated independently to simply find global motion estimations for other uses, or may be operated by the panoramic image generation program 92, as described next. Other uses of global motion estimations other than for producing panoramic images include moving-object image tracking applications, where in addition to the tracked object moving, the tracking image capture apparatus must also move. Global motion estimations can be useful here in compensating for the movement of the camera, in order to allow the true object movement to be found.

Figure 11:
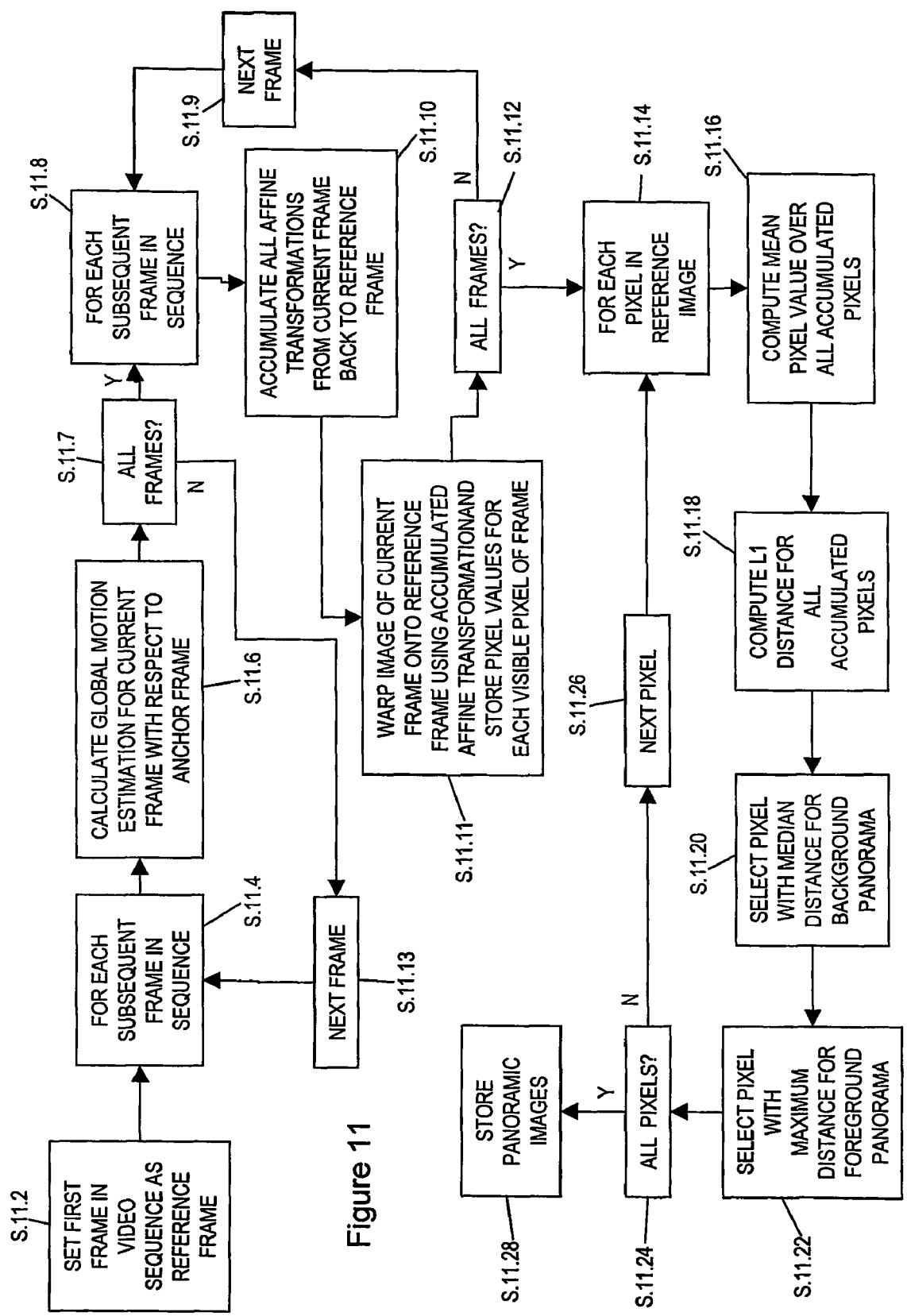
FIG. 11 is a flow diagram of an embodiment of a panoramic image generation method according to another aspect of example embodiments of the invention.

In addition to providing the global motion estimation program 92, the embodiment of the invention also provides the panoramic image generation program 94, and the operation of this program will be described next with respect to FIG. 11

Firstly, a user will have used the control program 90 to select a motion-encoded video sequence, and to indicate which shot from the sequence is to be made into a panoramic image. Then, the control program 90 launches the panoramic image generator program 94, and passes to the program the sequence of MPEG encoded video frames which the user has selected to be used to create the panoramic image. Once launched the first step the panoramic image generator program 92 performs at step 11.2 is to set the first frame in the received sequence as a reference image. In other embodiments other frames in the sequence may be used as the reference frame. By setting the first frame as a reference frame the plane of the first frame becomes a reference plane, which can be considered analogous to a "canvas" for a panoramic image onto which pixel values may be "painted". That is, the reference plane established by the first frame is also the plane of the panoramic image that is to be produced.

Next, at step 11.4 a FOR processing loop is commenced, which acts to process every frame in the received video sequence according to the steps contained within the loop, and notably step 11.6. At step 11.6 the panoramic image generator program 94 acts to launch the global motion estimator program 92, and passes to the estimator program 92 the frame presently being processed by the FOR loop, as well as the other frames in the video sequence. The global motion estimator program then operates as previously described to determine the transformation parameters for the present frame representative of the global motion of the frame, and these parameters are then passed back to the panoramic image generator program 94.

Next at step 11.7 an evaluation is undertaken to determine if all the frames in the sequence have been processed according to step 11.6, and if not at step 11.13 the next frame in the sequence is selected, and the FOR loop commences again for the next frame in the sequence. Thus the FOR loop of steps 11.4, 11.6, 11.7, and 11.13 causes the global motion estimator program to determine global motion estimations for every frame in the sequence.

Once all the frames have been processed according to the FOR loop the evaluation at step 11.7 returns positive, and processing proceeds to step 11.8, where a second FOR processing loop is started for each subsequent frame in the sequence other than the reference frame. This second FOR loop comprises steps 11.10 and 11.11. More particularly, at step 11.10 all of the determined affine transformations from the present frame being processed by the FOR loop back to the reference frame are accumulated, and then at step 11.11 the image of the present frame is warped onto the plane of the reference image using the accumulated affine transformations. The pixel values for each visible pixel of the frame are then stored for future use. It will be appreciated that where frames overlap due to the warping function there will be as many pixel values for a single pixel position on the reference plane as there are overlapping frames at that position.

At step 11.12 an evaluation is undertaken to determine if all the frames in the sequence have been processed according to steps 11.10 and 11.11, and if not at step 11.9 the next frame in the sequence is selected and steps 11.10 and 11.11 repeated in respect of that frame. Once all of the frames in the sequence have been processed, however, the evaluation returns a positive result and processing proceeds to step 11.14. At this point in the processing all of the frames in the sequence have been warped back to the reference plane. This has the practical effect that image registration between the frames is achieved, and the images within the frames are warped onto the plane of the reference frame. The processing has therefore reached the stage where panoramic images can be generated by selecting the appropriate pixel value to use for each pixel position.

The content contained in a video sequence includes the static (background) and dynamic (foreground) information. When constructing image panoramas from video sequences, it naturally leads to the concepts of background and foreground panoramas. Within the prior art foreground panoramas were constructed by taking the mismatched pixels (or groups of pixels) as foreground, and other pixels as background, but the embodiment of the invention uses a simpler and more efficient method to solve this problem. Put simply, within the embodiment of the invention a pixel in the panoramic background is constructed from substantially the median of the pixels from all frames of a video sequence that are mapped to the same pixel position, while the foreground panorama is made up of substantially the most extraordinary pixel of the available pixels mapped to the same position. This is explained in more detail next.

Suppose there are M accumulated values for a pixel position in the panoramic image. The mean RGB values are expressed as $$\bar{r} = \frac{1}{M}\sum_{i=1}^{M} r_i, \bar{g} = \frac{1}{M}\sum_{i=1}^{M} g_i, \bar{b} = \frac{1}{M}\sum_{i=1}^{M} b_i \qquad (8)$$

Next we compute the L1 distance, which is usually more robust than the L2 distance (see P. J. Huber. Robust Statistics. John Wiley & Sons Inc, 1981 for a discussion of L1 and L2 distances) between each accumulated pixel value ($r_i$, $g_i$, $b_i$) and the mean value ($\bar{r}$, $\bar{g}$, $\bar{b}$), using the following:

$$d_i = |r_i - \bar{r}| + |g_i - \bar{g}| + |b_i - \bar{b}| \qquad (9)$$

Then the pixel value with the median of $\{d_i, i=1, \ldots M\}$ is selected for the background panorama, while the one with the largest $d_i$, i.e. the most different pixel, is selected for the foreground panorama.

Returning to FIG. 11, therefore, and in view of the above, at step 11.14 a further FOR processing loop is initiated, which acts to process every pixel position in the reference image, so as to find the pixel value from the available pixel values for each position which should be used in each of a foreground and a background panoramic image. The FOR loop comprises steps 11.16, 11.18. 11.20. and 11.22 as the main processing steps therein, and which embody the process described above, as described next.

At step 11.16 the equation (8) above is used to compute the mean pixel value for the particular pixel position being processed by the FOR loop of all of the available pixel values for that position. Thus, where a particular position has five available pixel values, for example, (which would be the case where that position has five frames overlapping it), then the mean pixel value would be found of those five frames.

Next, at step 11.18 the L1 distance from the mean pixel value is found for each of the available pixel values for the present pixel position, using equation (9) above. Each L1 distance for each pixel is stored in an array, and once the distance has been found for each available pixel value, the array of L1 distance values is sorted into order.

Having sorted the array of distance values into order, the selection of the appropriate pixel value to be used for each type of panorama is then merely a matter of selecting that pixel whose distance value is in the appropriate position in the sorted array. Therefore, at step 11.20 a pixel value for use at the present pixel position in a background panorama is selected by taking that pixel value with the median distance value in the sorted array. This is relatively straightforward where there are an odd number of distance values in the array, the median value being the ((n+1)/2)th distance value, where n is the number of distance values in the array. Where there are an even number of distance values, however, then either the n/2th distance value may be taken as the median, or the (n/2+1)th distance value, and this is a matter of design choice. In other embodiments where there are an even number of distances in the array a median pixel value may be obtained by interpolating between the pixel values respectively relating to the n/2th distance value and the (n/2+1)th distance value.

For the foreground panorama, at step 11.22 the pixel value is selected which has the maximum L1 distance of the available pixels (i.e. the largest distance value located at the end of the sorted array) for use at the present pixel position.

Having selected the appropriate pixel values for use in background and foreground panorama for the present pixel position, at step 11.24 an evaluation is undertaken to determine whether all the pixel positions necessary for the panoramic images (i.e. all the pixel positions in the reference image taking into the warping of the other frames thereto) have been processed, and respective foreground and background pixel values selected for each pixel position. If this evaluation returns negative then at step 11.26 the next pixel position is selected, and the procedure of steps 11.16, 11.18., 11.20, and 11.22 is repeated for this next pixel position. This process is repeated until all the pixel positions have had foreground and background pixel values selected therefor, whereupon the evaluation will then return a positive result. Once this occurs processing proceeds to step 11.28, wherein the pixel values selected for each pixel position in the foreground panorama are then written to a foreground panorama image file, and then the pixel values selected for each pixel position in the background panorama are then written to a background panorama image file. Thus both a foreground and a background panoramic image can be generated and stored by the panoramic image generator program 94 for each video sequence input thereto.

Figure 17:
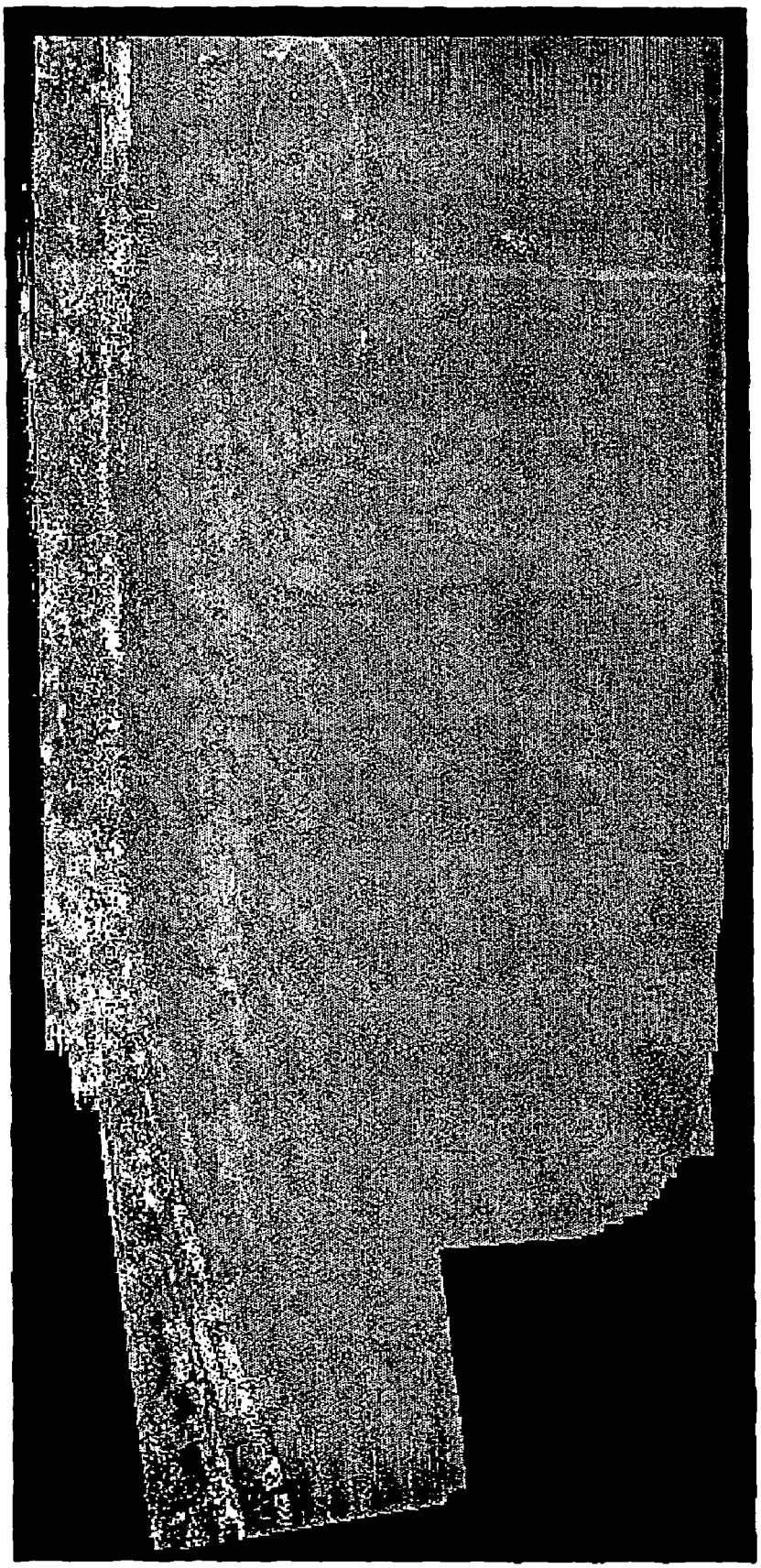
FIG. 17 is a background panoramic image generated by the embodiment of the present invention.
Figure 18:
FIG. 18 is a foreground panoramic image generated by the embodiment of the present invention.

With respect to example results obtained by the panoramic image generator program 92, an example foreground panorama constructed from the football video clip previously mentioned by the panoramic image generator program 92 is shown in FIG. 18 while its corresponding background panorama is shown in FIG. 17. Note that the trajectories of both the players and the ball are clearly displayed in the foreground panorama, and as a result it is not difficult to understand the whole process of the goal from the single foreground panoramic image. Looking at the background panorama of FIG. 17, and in particular comparing it with the panorama generated using the prior art "least mean squares" approach shown in FIG. 2, it will be seen that background panorama as generated by the present embodiment is much clearer and does not exhibit many of the deficiencies which are present in the prior art image.

There are numerous applications of example embodiments of the invention, which cover a large area including video compression, video visualisation, video synthesis, and video surveillance. We list several specific, but non-limiting, uses below.

Firstly, example embodiments of the invention may be used to provide mosaic based video compression. Here, after a panoramic background is constructed, the static scene can be represented efficiently using JPEG style compression techniques, and especially when a video contains a dominant static scene. Only the segmented foreground objects/activities, or even more simply, only the difference between a frame and its reference region in the panoramic scene, need to be coded. This should prove very useful for very low bit-rate transmission and video storage.

Secondly, example embodiments of the invention may also be used for mosaic based visualisation. In such a case the panoramic background and foreground images are used to provide a better understanding about both the static scene and the whole event that takes place in a video. Furthermore, a video sequence can be visualised as a set of "key frame mosaics", each encodes a continuous clip of the video. Obviously this is more representative than the conventional key frames.

A further use is in video synthesis. When combined with other techniques, such as image segmentation, the foreground activities as apparent from a foreground panorama can be extracted from a video against the panoramic background, the background panorama having been generated using example embodiments of the present invention. It is then possible to replace the background of the video with a different image therefore making the events in the video look as if they are taking place in another situation.

Another use of example embodiments of the invention is as a virtual camera. While an original video may not be taken in the perfect camera set-up (e.g. camera jigging or over-zooming), the ability to warp images to a reference frame and to perform accurate image registration as provided by example embodiments of the invention can allow a video image to be re-constructed from an ideal "virtual view".

Whilst example embodiments of the invention has been described herein as being implemented in software running on a computer system, it should also be understood that example embodiments of the invention could equally be implemented in hardware, for example for use in global motion estimation or panoramic image generation by hand-held digital cameras, camcorders, and the like. Such a hardware implementation would include suitable specific processors, other integrated circuits, memory and the like to perform the functions required by example embodiments of the present invention, and should be considered as functionally equivalent to the specifically described software embodiment.

In addition, throughout this description we have concentrated on the encoded video sequence being an MPEG encoded sequence, encoded according to any one of the MPEG standards. It is not, however, essential that the encoded video sequence be strictly MPEG encoded, as all that is required is an encoded video sequence which has been inter-frame encoded to produce motion vectors indicative of the general motion of a number of macroblocks which make up a frame with respect to a preceding or succeeding frame. Therefore, whilst the development of example embodiments of the invention has been based upon and is intended to encompass MPEG encoded video sequences, other video coding methods which provided the necessary motion vector information, but which may not be MPEG compliant may also be used to provide the encoded video sequence used by the invention.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A computer-implemented method of global motion estimation between frames of a motion-compensated inter-frame encoded video sequence, the method comprising, for a particular frame of the inter-frame encoded video sequence:

a) determining, using one or more computer processing systems, a motion estimation representative of the global motion between the particular frame and a first preceding or first succeeding frame of the inter-frame encoded video sequence, on the basis of motion vectors directly between the particular frame and the first preceding or first succeeding frame along a first route between the particular frame and the first preceding or first succeeding frame;

b) determining, using the one or more computer processing systems, one or more further motion estimations representative of the global motion between the particular frame and the first preceding or first succeeding frame at least partially on the basis of motion vectors between the particular frame and one or more preceding or succeeding other frames along one or more second routes between the particular frame and the first preceding or first succeeding frame, wherein the one or more second routes are different from the first route; and c) selecting, using the one or more computer processing systems, one of the motion estimations which meets at least one predetermined criterion as being representative of the global motion of the particular frame;

d) storing or outputting said selected motion estimation for use in registering an image of said particular frame with an image of said first preceding or first succeeding frame.

2. A method according to claim 1, wherein the determining step b) further comprises the steps of:

e) determining one or more motion estimations representative of the global motion of the frame with respect to one or more respective preceding or succeeding other frames;

f) determining one or motion estimations respectively representative of the global motion of the one or more other frames with respect to the first preceding or first succeeding frame; and g) accumulating the respective motion estimations to give one or more respective overall motion estimations each substantially representative of the global motion of the frame with respect to the first preceding or first succeeding frame.

3. A method according to claim 1, wherein the selecting step c) further comprises testing the motion estimations in turn; and outputting a motion estimation as being representative of the global motion of the frame if it passes the test, wherein the test is applied in turn to motion estimations once they have been determined, and if the test is passed then no further motion estimations are determined.

4. A method according to claim 3, wherein the test comprises comparing the motion estimation with a threshold value, wherein the test is passed if the parameters of the motion estimation do not exceed the threshold value.

5. A method according to claim 3, wherein if the test is failed, the method further comprises: interpolating between the motion estimations of adjacent frames to give an interpolated motion estimation which is then output as the motion estimation representative of the global motion of the frame.

6. A method according to claim 1 further comprising generating panoramic images from a motion-compensated inter-frame encoded video sequence, the generating comprising:

for each frame of the sequence, determining the global motion of each frame with respect to the first preceding or first succeeding frame using the method of claim 1; and generating at least one panoramic image representing the frames of the video sequence using the frame global motion estimations thus determined.

7. A method according to claim 6, wherein the generating step further comprises: selecting a particular frame of the sequence as a reference frame, the plane of the reference frame being a reference plane;

for each frame other than the reference frame, accumulating the frame global motion estimations from each frame back to the reference frame;

warping each frame other than the reference frame onto the reference plane using the accumulated frame global motion estimations to give one or more pixel values for each pixel position in the reference plane; and for each pixel position in the reference plane, selecting one of the available pixel values for use as the pixel value in the panoramic image.

8. A method according to claim 7, wherein the selecting step comprises selecting a substantially median pixel value from the available pixel values for use in a background panoramic image.

9. A method according to claim 7, wherein the selecting step comprises selecting a substantially most different pixel value from the available pixel values for use in a foreground panoramic image.

10. A method according to claim 7, wherein the selecting step comprises:

calculating the mean pixel value of the available pixel values;

calculating the L1 distance between each available pixel value and the calculated mean pixel value; and selecting the pixel value with the median L1 distance for use in a background panoramic image.

11. A method according to claim 7, wherein the selecting step comprises:

calculating the mean pixel value of the available pixel values;

calculating the L1 distance between each available pixel value and the calculated mean pixel value; and selecting the pixel value with the maximum L1 distance for use in a foreground panoramic image.

12. A non-transitory computer readable storage medium storing a computer program or suite of programs such that when executed on at least one computer system the program or suite of programs causes the at least one computer system to perform a method of global motion estimation between frames of a motion-compensated inter-frame encoded video sequence, the method comprising, for a particular frame of the inter-frame encoded video sequence:

a) determining a motion estimation representative of the global motion between the particular frame and a first preceding or first succeeding frame of the inter-frame encoded video sequence, on the basis of motion vectors directly between the particular frame and the first preceding or first succeeding frame along a first route between the particular frame and the first preceding or first succeeding frame;

b) determining one or more further motion estimations representative of the global motion between the particular frame and the first preceding or first succeeding frame at least partially on the basis of motion vectors between the particular frame and one or more preceding or succeeding other frames along one or more second routes between the particular frame and the first preceding or first succeeding frame, wherein the one or more second routes are different from the first route; and c) selecting one of the motion estimations which meets at least one predetermined criterion as being representative of the global motion of the particular frame;

d) storing or outputting said selected motion estimation for use in registering an image of said particular frame with an image of said first preceding or first succeeding frame.

13. A system for global motion estimation between frames of a motion-compensated inter-frame encoded video sequence, the system comprising:

a video processor arranged in use to:

i) determine a motion estimation representative of the global motion directly between a particular frame of the inter-frame encoded video sequence and a preceding or succeeding frame of the inter-frame encoded video sequence on the basis of motion vectors therebetween along a first route between the particular frame and the preceding or succeeding frame;

ii) determine one or more further motion estimations representative of the global motion between the particular frame and the preceding or succeeding frame at least partially on the basis of motion vectors between the particular frame and one or more preceding or succeeding other frames along one or more second routes between the particular frame and the preceding or succeeding frame, wherein the one or more second routes are different from the first route; and a motion estimation selector arranged in use to select one of the motion estimations which meets at least one predetermined criterion as being representative of the global motion of the frame.

14. A system according to claim 13, wherein the video processor is further arranged in use to:

determine one or more motion estimations representative of the global motion of the frame with respect to a one or more respective preceding or succeeding other frames;

determine one or motion estimations respectively representative of the global motion of the one or more other frames with respect to the preceding or succeeding frame; and accumulate the respective motion estimations to give one or more respective overall motion estimations each substantially representative of the global motion of the frame with respect to the preceding or succeeding frame.

15. A system according to claim 13, wherein the motion estimation selector further comprises a motion estimation tester for testing the motion estimations in turn, and providing an indication as to whether the test is passed; and an output unit arranged in use to output a motion estimation as being representative of the global motion of the frame in dependence on the receipt of an indication that the test was passed from the motion estimation tester, wherein the motion estimation tester is further arranged to apply the test in turn to motion estimations once they have been determined, and if the test is passed then no further motion estimations are determined.

16. A system according to claim 15, wherein the test comprises comparing the motion estimation with a threshold value, wherein the test is passed if the parameters of the motion estimation do not exceed the threshold value.

17. A system according to claim 15, and further comprising a motion estimation interpolation unit arranged to interpolate between the motion estimations of adjacent frames to give an interpolated motion estimation, in dependence on the motion estimation testing means indicating that the test has been failed by all the motion estimations determined by the video processor.

18. A system for generating panoramic images from a motion-compensated inter-frame encoded video sequence, comprising:
   a system for global motion estimation between frames of a motion-compensated inter-frame encoded video sequence, the system for global motion estimation comprising:
   a video processor arranged in use to:
      i) determine a motion estimation representative of the global motion directly between a particular frame of the inter-frame encoded video sequence and a preceding or succeeding frame of the inter-frame encoded video sequence on the basis of motion vectors therebetween along a first route between the particular frame and the preceding or succeeding frame;
      ii) determine one or more further motion estimations representative of the global motion between the particular frame and the preceding or succeeding frame at least partially on the basis of motion vectors between sub-parts of the particular frame and sub-parts of one or more preceding or succeeding other frames along one or more second routes between the particular frame and the preceding or succeeding frame, wherein the one or more second routes are different from the first route; and
   a motion estimation selector arranged in use to select one of the motion estimations which meets at least one predetermined criterion as being representative of the global motion of the frame;
   and further arranged to provide global motion estimations for each frame; and
   a panoramic image generating unit for generating at least one panoramic image representing the frames of the video sequence using the global motion estimations thus determined.

19. A system according to claim 18, wherein the panoramic image generating unit is further arranged in use to:
   select a particular frame of the sequence as a reference frame, the plane of the reference frame thereby being a reference plane;
   for each frame other than the reference frame, accumulate the global motion estimations from each frame back to the reference frame;
   warp each frame other than the reference frame onto the reference plane using the accumulated global motion estimations to give one or more pixel values for each pixel in the reference plane; and
   for each pixel position in the reference plane, select one of the available pixel values for use as the pixel value in the panoramic image.

20. A system according to claim 19, wherein
   the panoramic image generating unit is further arranged to select a substantially median pixel value from the available pixel values for use in a background panoramic image.

21. A system according to claim 18, wherein
   the panoramic image generating unit is further arranged to select a substantially most different pixel value from the available pixel values for use in a foreground panoramic image.

22. A system according to claim 18, wherein
   the panoramic image generating unit is further arranged to:
   calculate the mean pixel value of the available pixel values;
   calculate the L1 distance between each available pixel value and the calculated mean pixel value; and
   select the pixel value with the median L1 distance for use in a background panoramic image.

23. A system according to claim 18, wherein
   the panoramic image generating unit is further arranged to:
   calculate the mean pixel value of the available pixel values;
   calculate the L1 distance between each available pixel value and the calculated mean pixel value; and
   select the pixel value with the maximum L1 distance for use in a foreground panoramic image.

* * * * *